(12) United States Patent
Devolder et al.

(10) Patent No.: US 12,388,658 B2
(45) Date of Patent: Aug. 12, 2025

(54) SYSTEMS AND METHODS FOR INITIALIZING A DISTRIBUTED CRYPTOGRAPHY AS A SERVICE APPLICATION

(71) Applicant: Mastercard International Incorporated, Purchase, NY (US)

(72) Inventors: Eric Devolder, Vedrin (BE); Eric G. Alger, Louisiana, MO (US); Eric Trent Robins, Wentzville, MO (US)

(73) Assignee: Mastercard International Incorporated, Purchase, NY (US)

( * ) Notice: Subject to any disclaimer, the term of this patent is extended or adjusted under 35 U.S.C. 154(b) by 151 days.

(21) Appl. No.: 18/485,773

(22) Filed: Oct. 12, 2023

(65) Prior Publication Data
US 2025/0125976 A1 Apr. 17, 2025

(51) Int. Cl.
*H04L 9/32* (2006.01)
*H04L 9/08* (2006.01)

(52) U.S. Cl.
CPC .......... *H04L 9/3263* (2013.01); *H04L 9/0822* (2013.01)

(58) Field of Classification Search
CPC ............................ H04L 9/3263; H04L 9/0822
See application file for complete search history.

(56) References Cited

U.S. PATENT DOCUMENTS

| | | | | |
|---|---|---|---|---|
| 2006/0291664 | A1* | 12/2006 | Suarez | H04L 9/3263 380/286 |
| 2014/0173284 | A1* | 6/2014 | Ganesan | H04L 9/3247 713/171 |
| 2020/0244468 | A1* | 7/2020 | Bartok | G06F 21/602 |
| 2022/0393882 | A1* | 12/2022 | Shaffer | H04L 9/3263 |

FOREIGN PATENT DOCUMENTS

KR 20210045632 4/2021

OTHER PUBLICATIONS

International Search Report and Written Opinion for PCT Application No. PCT/US2024/046536 (Dated Dec. 24, 2024).

* cited by examiner

*Primary Examiner* — William J. Goodchild
(74) *Attorney, Agent, or Firm* — Hovey Williams LLP

(57) ABSTRACT

An application server has a custodian application running thereon. The custodian application instantiates a cryptographic microservice. The cryptographic microservice application builds a white-box cryptographic enclave. The custodian application transmits a request for an authorization grant to an authentication computing system. In response, the authentication computing system returns the authorization grant. The custodian application transmits the authorization grant to the cryptographic microservice application. The cryptographic microservice application transmits the authorization grant to the authentication computing system and then receives a digitally signed certificate therefrom. The cryptographic microservice application receives a data encryption key from the custodian application. The cryptographic microservice application transmits a request to the authentication computing system. The request includes the digitally signed certificate, the data encryption key, and a request to decrypt the data encryption key. The cryptographic microservice application then receives the decrypted data encryption key from the authentication computing system.

20 Claims, 13 Drawing Sheets

SYSTEMS AND METHODS FOR INITIALIZING A DISTRIBUTED CRYPTOGRAPHY AS A SERVICE APPLICATION

BACKGROUND

The present invention relates generally to cryptographic services, and more particularly, to a decentralized and distributed cryptography as a service system.

Cryptography as a Service (CaaS) refers to the provision of cryptographic services and capabilities to users or organizations through a centralized service. CaaS typically involves outsourcing cryptographic operations to a service provider who manages and maintains the necessary infrastructure and tools for encryption, decryption, key management, and other cryptographic functions.

In the financial industry, where the protection of sensitive financial information and secure communication are important, cryptography plays a vital role. Cryptographic techniques are used to ensure the confidentiality, integrity, and authenticity of financial transactions, sensitive data, and communication channels. Traditional approaches involve organizations implementing their own cryptographic systems and infrastructure, which can be complex, costly, and require ongoing maintenance and updates.

At least some known CaaS systems are extremely large systems. For example, known CaaS systems utilized in the financial industry may include twelve (12) to fourteen (14) nodes. Generally, each node is a large server and may include up to sixty-four (64) processors and a terabyte of memory. Such systems are prohibitively expensive, often topping two million dollars ($2,000,000) in cost.

While the Internet has made it easier for consumers to consume software services from remote locations, there are some problems that centralized CaaS systems cannot solve. For example, network latency can often be a limiting factor on a CaaS implementation. Furthermore, with large CaaS deployments, an internal network latency may be too high. Consequently, high throughput applications may not always be the best fit for centralized CaaS systems.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, an application server is provided. The application server includes a custodian application running thereon. The application server includes one or more processors and a memory. The memory has computer-executable instructions stored thereon that, when executed by the one or more processors, cause the one or more processors to instantiate, by the custodian application, a cryptographic microservice application on the application server. The one or more processors build, via the cryptographic microservice application, a white-box cryptographic enclave in the memory of the application server. The one or more processors transmit, by the custodian application, a request message to an authentication computing system. The request message includes a request for an authorization grant. In response to the request message, the one or more processors receive, by the custodian application, the authorization grant from the authentication computing system. The one or more processors transmit, by the custodian application, the authorization grant to the cryptographic microservice application. Furthermore, the one or more processors transmit, by the cryptographic microservice application, the authorization grant to the authentication computing system. Additionally, the one or more processors receive, by the cryptographic microservice application, a digitally signed certificate from the authentication computing system. Furthermore, the one or more processors receive, by the cryptographic microservice application from the custodian application, a data encryption key encrypted with a master tenant key associated with the custodian application. Moreover, the one or more processors transmit, via the cryptographic microservice application, a request to the authentication computing system. The request includes the digitally signed certificate, the data encryption key, and a request to decrypt the data encryption key. In addition, the one or more processors receive the decrypted data encryption key from the authentication computing system based on validation of the digitally signed certificate.

In another aspect, a method performed by an application server is provided. The application server has a custodian application running thereon. The method includes instantiating, by the custodian application, a cryptographic microservice application on the application server. The method also includes building, by the cryptographic microservice application, a white-box cryptographic enclave in the memory of the application server. Furthermore, the method includes transmitting, by the custodian application, a request message to an authentication computing system. The request message includes a request for an authorization grant. The method also includes receiving, by the custodian application in response to the request message, the authorization grant from the authentication computing system. Moreover, the method includes transmitting, by the custodian application, the authorization grant to the cryptographic microservice application. Additionally, the method includes transmitting, by the cryptographic microservice application, the authorization grant to the authentication computing system and receiving a digitally signed certificate from the authentication computing system in response. The method includes receiving, by the cryptographic microservice application from the custodian application, a data encryption key encrypted with a master tenant key associated with the custodian application. Moreover, the method includes transmitting, via the cryptographic microservice application, a request to the authentication computing system. The request includes the digitally signed certificate, the data encryption key, and a request to decrypt the data encryption key. Additionally, the method includes receiving, based on validation of the digitally signed certificate, the decrypted data encryption key from the authentication computing system.

In yet another aspect, a non-transitory computer-readable storage medium is provided. The computer-readable storage medium has computer-executable instructions stored thereon. The computer-executable instructions, when executed by one or more processors, cause the one or more processors to instantiate a cryptographic microservice application. The computer-executable instructions cause the one or more processors to build, by the cryptographic microservice application, a white-box cryptographic enclave in a memory of an application server. In addition, the computer-executable instructions cause the one or more processors to transmit a request message to an authentication computing system. The request message includes a request for an authorization grant. Moreover, the computer-executable instructions cause the one or more processors to, in response to the request message, receive the authorization grant from the authentication computing system. The computer-executable instructions also cause the one or more processors to transmit the authorization grant to the cryptographic microservice application. Furthermore, the computer-executable instructions cause the one or more processors to transmit, by the cryptographic microservice application, the authorization grant to the authentication computing system. Additionally, the computer-executable instructions cause the one or more processors to receive, by the cryptographic microservice application, a digitally signed certificate from the authentication computing system. Also, the computer-executable instructions cause the one or more processors to transmit, to the cryptographic microservice application, a data encryption key encrypted with a master tenant key associated with a custodian application. Furthermore, the computer-executable instructions also cause the one or more processors to transmit, via the cryptographic microservice application, a request to the authentication computing system. The request includes the digitally signed certificate, the data encryption key, and a request to decrypt the data encryption key. Additionally, the computer-executable instructions also cause the one or more processors to receive, based on validation of the digitally signed certificate, the decrypted data encryption key from the authentication computing system.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary System

Figure 1:
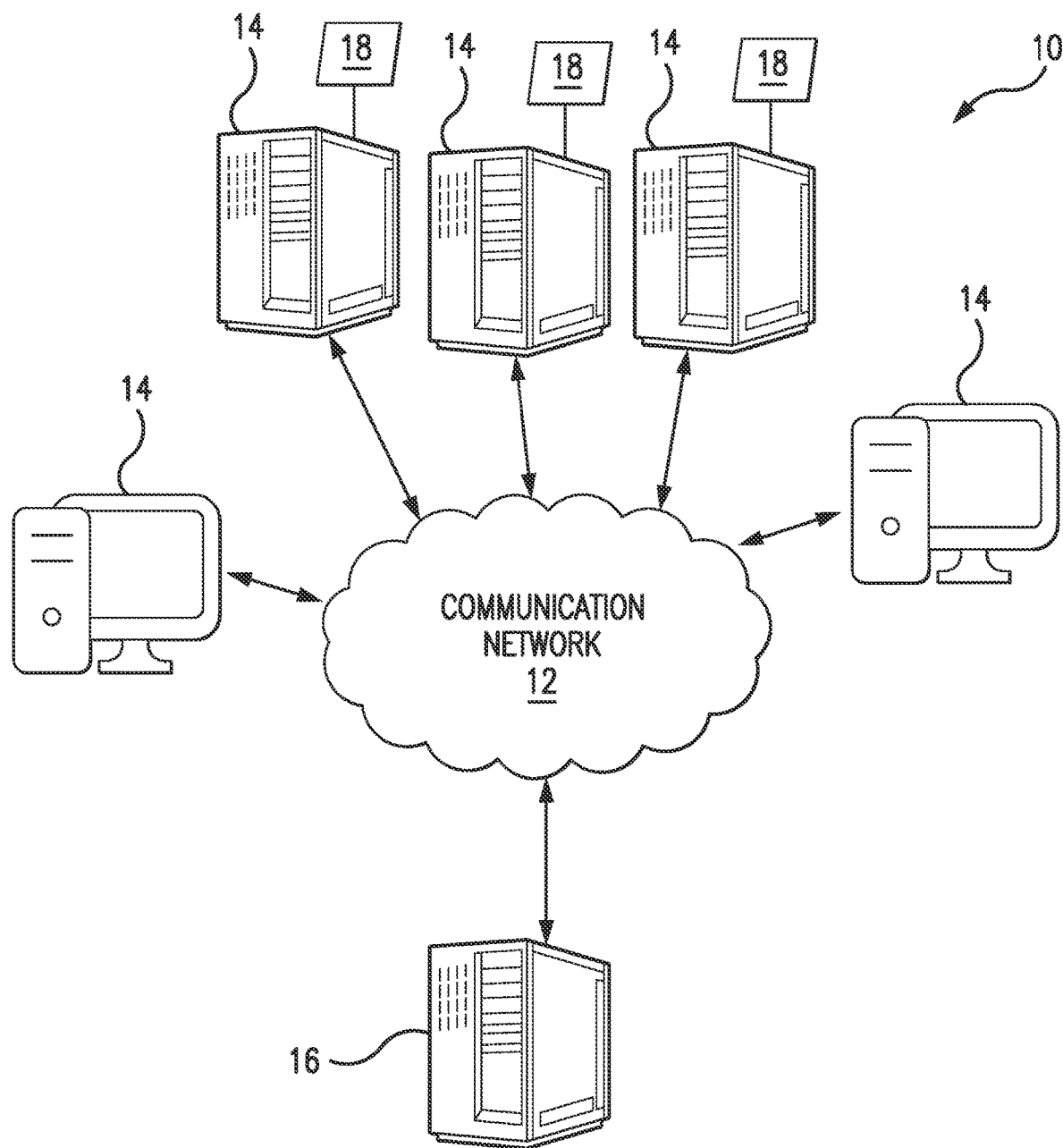
FIG. 1 is an exemplary system for providing cryptographic services, and more particularly, distributed cryptography as a service (D-CaaS), to various end user systems.

FIG. 1 depicts an exemplary system 10 for providing cryptographic services, and more particularly, distributed cryptography as a service (D-CaaS), to various end user systems. The system may include a communication network 12 and a plurality of application servers 14. Each application server 14 may include a desktop computer, a laptop or tablet computer, an application server, a database server, a file server, or the like, and/or combinations thereof, configured to execute or run one or more business applications that utilize cryptographic services. The server system 16 may include and/or work in conjunction with application servers, database servers, file servers, gaming servers, mail servers, print servers, or the like, or combinations thereof. Furthermore, the server system 16 may include a plurality of servers, virtual servers, or combinations thereof.

The communication network 12 may provide wired and/or wireless communication between the application servers 14 and the server system 16. Each of the server system 16 and application servers 14 may be configured to send data to and/or receive data from the communication network 12 using one or more suitable communication protocols, which may be the same communication protocols or different communication protocols as one another.

The communication network 12 generally allows communication between the application servers 14 and the server system 16. For example, the application servers 14 may periodically request various cryptographic services from the server system 16 over the communication network 12.

The communication network 12 may include one or more telecommunication networks, nodes, and/or links used to facilitate data exchanges between one or more devices and may facilitate a connection to the Internet for devices configured to communicate with communication network 12. The communication network 12 may include local area networks, metro area networks, wide area networks, cloud networks, the Internet, cellular networks, plain old telephone service (POTS) networks, and the like, or combinations thereof. The communication network 12 may be wired, wireless, or combinations thereof and may include components such as modems, gateways, switches, routers, hubs, access points, repeaters, towers, and the like.

The application servers 14 and the server system 16 may connect to the communication network 12 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as WiFi, IEEE 802.16 standards such as WiMAX, Bluetooth™, or combinations thereof. In aspects in which the communication network 12 facilitates a connection to the Internet, data communications may take place over the communication network 12 via one or more suitable Internet communication protocols. For example, the communication network 12 may be implemented as a wireless telephony network (e.g., GSM, CDMA, LTE, etc.), a Wi-Fi network (e.g., via one or more IEEE 802.11 Standards), a WiMAX network, a Bluetooth network, etc.

The application servers 14 are configured to execute or run one or more business applications (not shown in FIG. 1). In some embodiments, one or more of the business applications may be installed on various client devices (not shown). The application servers 14 may store the respective business applications and provision instances of the business applications to end-users on their respective user devices/client devices. For example, in an embodiment, an end-user may request an application server 14 to provision access to a business application over the communication network 12. In response, an instance of the business application associated with the application server 14 may be downloaded on the client device of the respective end-user. Alternatively or additionally, in an embodiment, a business application may be installed on a client device associated with an end-user. In such an instance, accessing the business application may cause the client device to establish a secure connection/session with a respective application server 14 for data communication.

In the example embodiment, one or more of the application servers 14 may be associated with a financial institution, such as an "acquirer bank" or "acquiring bank" or simply "acquirer," in which an end-user operating the client device may have an acquirer account. Furthermore, one or more of the application servers 14 may be associated with another financial institution, such as an "issuer," "issuing bank," or "issuer bank," in which an end-user operating the client device may have an issuer account. Examples of the application servers 14 include a digital wallet server, a cryptographic server, a payment server managed by payment card issuing authorities, and/or a payment server associated with a payment interchange network (not shown).

In an example, the business applications hosted and/or run by the application servers 14 may utilize a variety of cryptographic functions to ensure security and integrity of an end-user's data and transactions. These cryptographic functions may include encryption, decryption, hashing, digital signature, data integrity, and key management. An end-user's data and transactions need to be protected using such cryptographic functions, for example, during transmission from one entity to another to prevent the data being intercepted and potential fraudulently used.

As discussed above, current technology provides cryptography as a service (CaaS) via a remote server, such as the server system 16. Such a CaaS system is a centralized service and requires a very large, expensive system. As such, it is impracticable to deploy such a CaaS system in many locations. A single CaaS system location is limited in the number of application servers, such as application servers 14, that can be serviced. Furthermore, a centralized CaaS system has problems that cannot be solved. For example, network latency can often be a limiting factor in implementation. So high throughput business applications may not function properly in such centralized CaaS systems.

To remove these limitations and solve the known problems with current CaaS systems, the system 10 of a preferred embodiment of the present invention includes a plurality of distributed cryptography as a service (D-CaaS) microservice applications 18. Each D-CaaS microservice application 18 (also referred to herein as a D-CaaS microservice) is associated with, or bound to, a respective business application (not shown in FIG. 1) executed or run on a respective application server 14. The D-CaaS microservices 18 are in communication with the server system 16 over the communication network 12. The application servers 14 and the server system 16 communicate with one another via the communication network 12.

In the example embodiment, the D-CaaS microservice application 18 implements the same interface (such as a RESTful API) as current technology CaaS systems, but rather than being a centralized service, the D-CaaS microservice application 18 operates as a distributed service. The D-CaaS microservice application 18 runs as a containerized application locally next to its respective business application on the application server 14 and interfaces with CaaS on the server system 16, for example, for key management operations. Alternatively, the D-CaaS microservice application 18 may interface with any centralized key management system (KMS) for key management operations that allows the D-CaaS microservice application 18 to function as described herein. The cryptographic functions described above may then be performed locally by the D-CaaS microservice application 18, on the same infrastructure as the business application. Because the cryptographic functions are performed by the D-CaaS microservice application 18 and the cryptographic keys also can be maintained by the D-CaaS microservice application 18, the overall efficiency, security, and performance of the application servers 14 may be increased. Further, this solution allows an end-user to consume cryptographic services without the need to continuously access the server system 16, thereby eliminating the problem of network latency.

Exemplary Computer Systems

Figure 2:
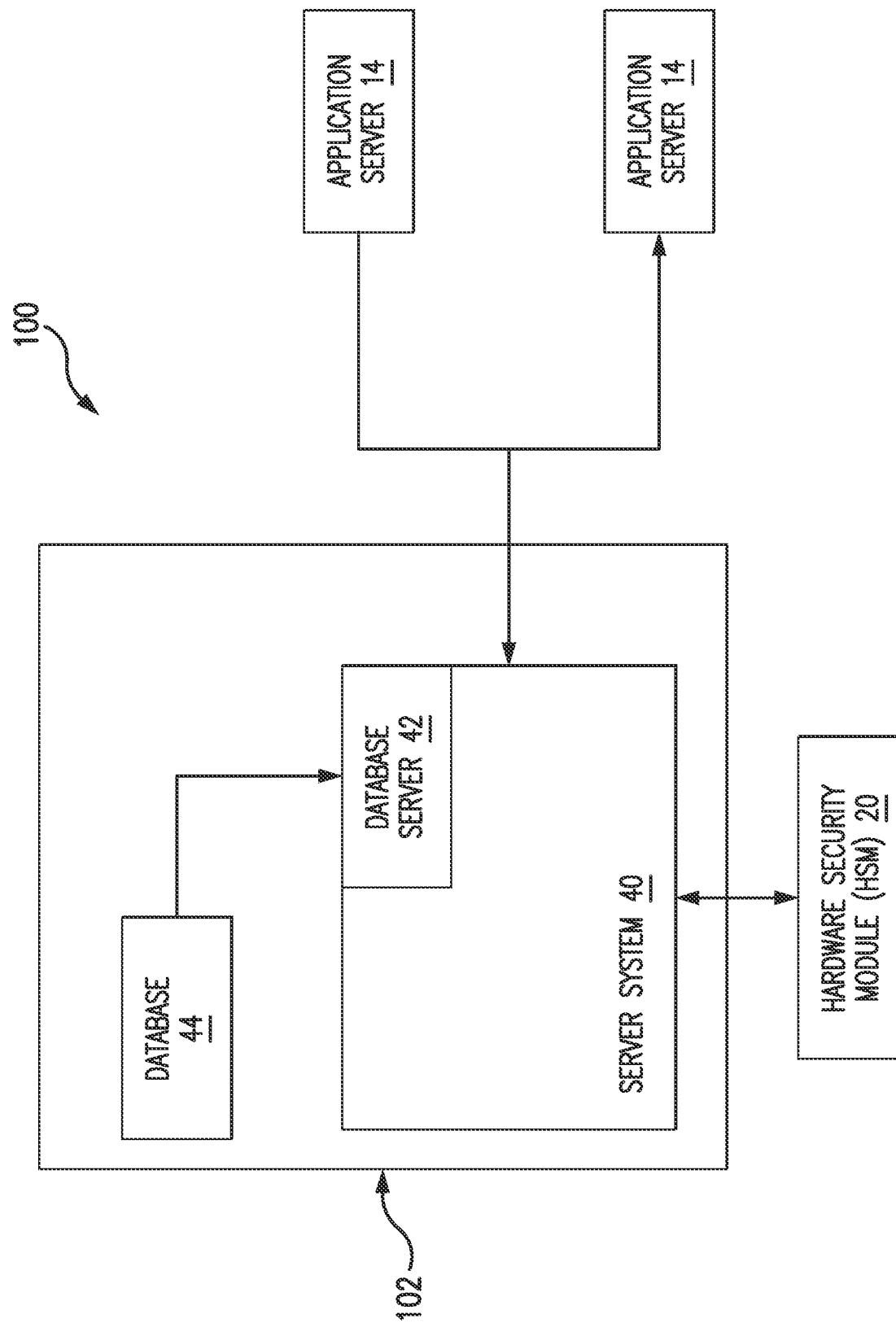
FIG. 2 is a simplified block diagram of an example payment network, which may offer cryptographic functions as cryptography as a service (CaaS)

FIG. 2 is a simplified block diagram of an example payment network 100 having a transaction processing system 102, which may offer cryptographic functions as cryptography as a service (CaaS). In an embodiment, the payment network 100 is similar to the system 10 (shown in FIG. 1).

In the example embodiment, the payment network 100 includes a plurality of computing devices connected in accordance with the present disclosure. The payment network 100 includes a server system 40 of the processing system 102. The server system 40 is in communication with one or more application servers, such as the application servers 14. The application servers 14 may be located, for example, at an issuer, acquirer, and/or any other customer of the payment network 100 utilizing CaaS.

In the example embodiment, the processing system 102 includes one or more application servers 14, each of which may be connected to the server system 40. The application servers 14 may be interconnected to the Internet (or any other network that allows the application servers 14 to communicate as described herein) through many interfaces including a network, such as a local area network (LAN) or a wide area network (WAN), dial-in-connections, cable modems, wireless modems, and special high-speed ISDN lines. The application servers 14 are any device capable of interconnecting to the Internet. In some embodiments, an application server 14 may be a user's personal computing device, such as when conducting an online transaction through the Internet.

A database server 42 is connected to a database 44, which is configured to store information on a variety of matters. In one embodiment, the database 44 is a centralized database stored on the server system 40. The database 44 may be accessed by potential users at one of the application servers 14 by logging onto the server system 40 through one of the application servers 14. In an alternative embodiment, the database 44 is stored remotely from the server system 40 and may be a distributed or non-centralized database.

In one example embodiment, the database 44 may include a single database having separated sections or partitions or may include multiple databases, each being separate from each other. The database 44 may store and maintain cryptographic keys and key identifiers (IDs) or indexes, policy data for policy-based access control of the one or more business applications, business application and application server identifiers, etc., for authenticating and providing cryptographic services to the one or more business applications. Cryptographic key indexes include an identifier key associated with a particular business application. The identifier key may be used to fetch the corresponding cryptographic keys of that particular business application from the database 44.

In the example embodiment, the server system 40 may be associated with a financial transaction processing network, such as an interchange network (not shown), and may be referred to as an interchange computer system. The server system 40 may be used for providing cryptographic services for processing transaction data. In addition, as noted above, the application servers 14 may include computer systems associated with at least one of a merchant, an online bank, a bill payment outsourcer, an acquirer bank, an acquirer processor, an issuer bank associated with a transaction card, an issuer processor, a remote payment processing system, and/or a biller.

In the example embodiment, the processing system 102 may be in communication with the hardware security module (HSM) 20. The HSM 20 may be configured to perform one or more cryptographic functions requested, for example, in cryptographic operation commands sent by the server system 40. The HSM 20 may utilize the cryptographic keys to perform the cryptographic functions.

It is noted that the payment network 100 may include more, fewer, or alternative components and/or perform more, fewer, or alternative actions, including those discussed elsewhere herein.

Figure 3:
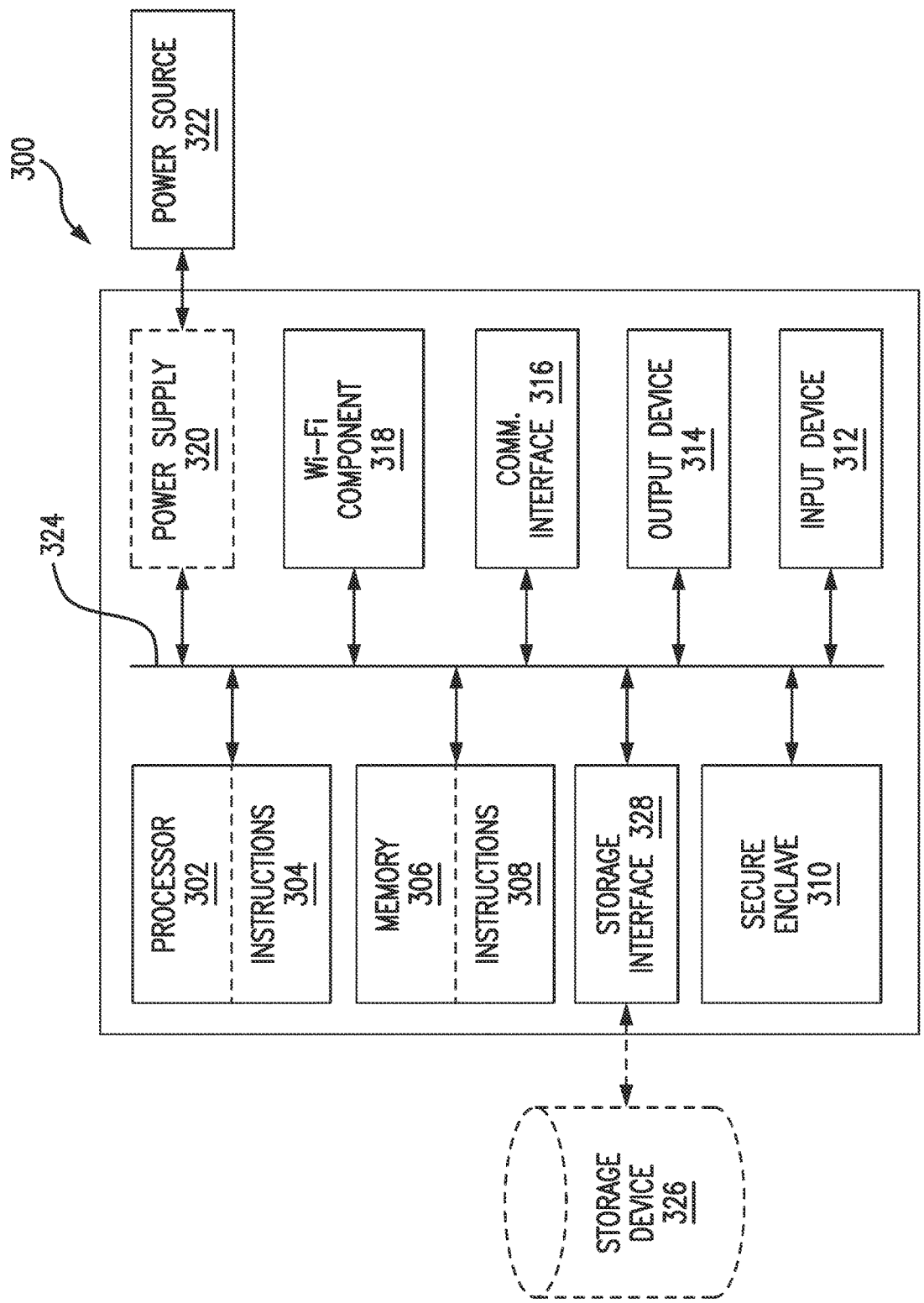
FIG. 3 is an example configuration of a server system, such as an application server of the system of FIG. 1.

FIG. 3 is an example configuration of a server system 300, such as the application server 14 (shown in FIG. 1). In the exemplary embodiment, the server system 300 may be a computing device configured to connect to the server system 16 (shown in FIG. 1) or any other computing devices, for example, via the communication network 12.

In the exemplary embodiment, the server system 300 may generally include one or more processors 302, a memory device 306, a secure enclave 310, an input device 312, an output device 314, a communication interface 316, an integrated Wi-Fi component 318 (e.g., implementing the Institute of Electrical and Electronics/IEEE 802.11 family of standards), each of which may communicate with each other component over an interconnect 324 (e.g., a bus). Optionally, the server system may include an internal power supply 320 (e.g., a battery or other self-contained power source) to receive power. Alternatively, in some embodiments, the server system 300 may include an external power source 322.

The one or more processors 302 may include one or more processing units (e.g., in a multi-core configuration) specially programmed for executing computer readable instructions, such as instruction 304. The instructions 304 may be executed within a variety of different operating systems (OS) on the server system 300, such as UNIX, LINUX, Microsoft Windows®, etc. More specifically, the instructions may cause various data manipulations on data stored in the memory device 306 (e.g., create, read, write, update, and delete procedures). It should also be appreciated that upon initiation of a computer-based method, various instructions 304 may be executed during initialization. Some operations may be required to perform one or more processes described herein, while other operations may be more general and/or specific to a programming language (e.g., C, C#, C++, Java, or other suitable programming languages, etc.). The memory device 306 may be any device allowing information such as cryptographic keys, executable instructions 308, and/or other data to be stored and retrieved. The memory device 306 may include one or more computer readable media.

In the example embodiment, the processor 302 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic functions, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the server system 300 may be widely deployed, it may be impractical to manually update software for each server system 300. Therefore, the system 10 may provide a mechanism for automatically updating the software on the server system 300. For example, an updating mechanism may be used to automatically update any number of components and their drivers, both network and non-network components, including system level (OS) software components. In some embodiments, the server system 300 components may be dynamically loadable and unloadable; thus, they may be replaced in operation without having to reboot the OS.

The memory device 306 may be any type of memory device that enables the server system 300 to function as described herein. For example, the memory device 306 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In some embodiments, the memory device 306 may include two or more memory devices and may be of any number of different package types such as single die package (SDP), dual die package (DDP) or quad die package (Q17P). The memory device 306, in some examples, may be directly soldered onto a motherboard (not shown) and/or may be configured as one or more memory modules that couple to the motherboard via a connector. Any number of other memory implementations may be used, such as other types of memory modules, including, but not limited to, read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

The secure enclave 310 is configured to separate and protect sensitive code and data from other processes running on the server system 300. In the example embodiment, the secure enclave 310 operates as a trusted execution environment (TEE). The TEE is a secure area of a main processor, such as the one or more processors 302, which guarantees confidentiality and integrity of code and data loaded inside. The TEE, as an isolated execution environment, provides security features such as isolated execution, integrity of applications executing with the TEE, along with confidentiality of their assets. The TEE (or secure enclave 310) may be a hardware, software, or firmware component (e.g., Trusted Computing Group (TCG) Trusted Platform Module (TPM), Trusted Execution Environment (TEE), Virtual TPM, Intel® Software Guard Extension (SGX), Intel® Enhanced Privacy ID (EPID), Arm TrustZone, SIM card based on Java Card technology, etc.). The secure enclave 310 may provide a set of trusted functions that execute in the TEE on the server system 300. The trusted functions may include, for example, device identification, key generation, encrypt, decrypt, sign and verify operations, etc.

The secure enclave 310 may ensure that sensitive data is stored, processed, and protected in a trusted environment. In some embodiments, the secure enclave 310 may be tamper-proof. For example, the secure enclave 310 may include tampering evidence capability (for tamper-proofing), which is a desired security function for storing encryptions keys, authentication credentials, and/or payment credentials. The ability of the secure enclave 310 to offer safe execution of cryptographic functions for authorized security software, which are sometimes referred to as "trusted applications," enables the secure enclave 310 to provide end-to-end security by enforcing protection, confidentiality, integrity, and data access rights.

In an embodiment, Intel Software Guard Extensions (SGX) include a set of security-related instruction codes that are built into some modern Intel processors. SGX allows user-level and operating system code to define enclaves-private regions of memory whose contents are protected and unable to be either read or saved by any outside process. SGX involves encryption by the processor, such as the one or more processors 302, of a portion of memory and protects data via application isolation technology. In cryptography, SGX can be used to conceal proprietary algorithms and encryption keys.

An SGX operates as a black-box where no other application running on the same device, such as the server system 300, can see inside regardless of privilege. From a security standpoint, this means that even if a malicious actor were to gain complete control of the system, including root privileges, that actor would not be able to access data inside the SGX. An Intel enclave is a form of user-level TEE that can provide both storage and execution-users can store sensitive information, as well as move sensitive portions of a program or an entire application inside.

Stored in the memory device 306 are, for example, computer readable instructions 308 for providing a user interface to a user via the output device 314 and, optionally, receiving and processing input from the input device 312. A user interface may include, among other possibilities, a web browser and a business application. Web browsers enable users to view and interact with media and other information typically embedded on a web page or a website. A client or business application allows the user to interact with a server application, for example, associated with the server system 16.

The input device 312 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both the output device 314 and the input device 312. The server system 300 may also include a communication interface 316, which is communicatively connectable to a remote device such as the server system 16 (shown in FIG. 1). The communication interface 316 may provide, for example, a wired communication to the communication network 12 or to other devices, such as the server system 16. The wired communication may provide an Ethernet connection or may be based on other types of networks, such as Controller Area Network (CAN), Local Interconnect Network (LIN), DeviceNet, ControlNet, etc.

In the example embodiment, the output device 314 may include, for example, and without limitation, a liquid crystal display (LCD), an organic light emitting diode (OLED)

display, or an "electronic ink" display. In some embodiments, a single component such as a touch screen may function as both an output device (e.g., the output device 314) and the input device 312. As such, the output device 314 may optionally include a touch controller for support of touch capability. In such embodiments, the server system 300 may detect a user's presence by detecting that the user has touched the output device 314 of the server system 300.

The Wi-Fi component 318 (broadly, a communication interface) may be communicatively connectable to a remote device such as the network 12 (shown in FIG. 1), the server system 16 (shown in FIG. 1), and/or the server system 40 (shown in FIG. 2). The Wi-Fi component 318 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

The processor 302 may be operatively coupled to a storage device 326. The storage device 326 may be any computer-operated hardware suitable for storing and/or retrieving data, such as data encryption keys described herein. In some embodiments, the storage device 326 may be integrated into the server system 300. In other embodiments, the storage device 326 may be external to the server system 300 and is similar to the database 44 (shown in FIG. 2). For example, the server system 300 may include one or more hard disk drives that function as the storage device 326. In other embodiments, where the storage device 326 may be external to the server system 300, the storage device 326 may be accessed by a plurality of server systems 300. For example, the storage device 326 may include multiple storage units such as hard disks or solid-state disks in a redundant array of inexpensive disks (RAID) configuration. The storage device 326 may include a storage area network (SAN) and/or a network attached storage (NAS) system.

In some embodiments, the processor 302 may be operatively coupled to the storage device 326 via a storage interface 328. The storage interface 328 may be any component capable of providing the processor 302 with access to the storage device 326. The storage interface 328 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 326.

In some embodiments, the server system 300 may be connected to one or more peripheral devices (not shown). That is, the server system 300 may communicate various data with one or more peripheral devices. For example, the server system 300 may communicate with one or more peripheral devices through the Wi-Fi component 318, the communication interface 316, or other suitable means.

Figure 4:
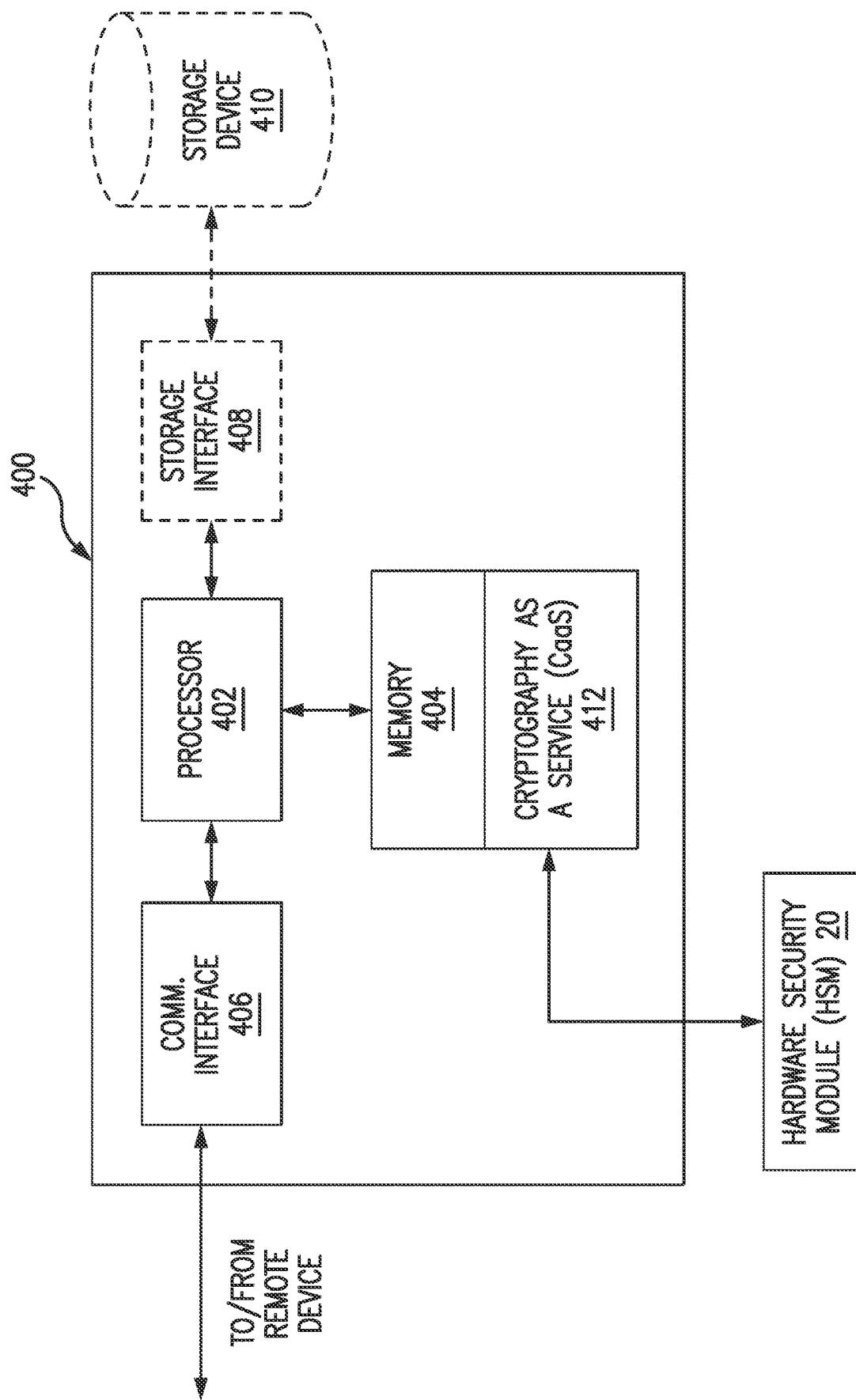
FIG. 4 is an example configuration of a server system, such as the server system shown in FIG. 1.

FIG. 4 is an example configuration of a server system 400, such as the server system 16 (shown in FIG. 1). The server system 400 includes, but is not limited to, the HSM 20 (shown in FIG. 2). In the example embodiment, the server system 400 includes a processor 402 for executing instructions. The instructions may be stored in a memory 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as a user computing system 300 (shown in FIG. 3), a computing system 400 (shown in FIG. 4), and/or another server system 400. For example, the communication interface 406 may receive communications from one or more application servers 14 via the Internet, as illustrated in FIG. 2.

The processor 402 is operatively coupled to the storage device 410. The storage device 410 is any computer-operated hardware suitable for storing and/or retrieving data. In some embodiments, the storage device 410 is integrated into the server system 400. In other embodiments, the storage device 410 is external to the server system 400 and is similar to the database 44 (shown in FIG. 2). For example, the server system 400 may include one or more hard disk drives that function as the storage device 410. In other embodiments, the storage device 410 may be external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In an embodiment, the memory 404 includes a centralized Cryptography as a Service (CaaS) system 412, stored thereon. The CaaS system 412, when executed by the processor 402, enables the server system 400 to perform various cryptographic functions requested, for example, by remote computing devices, such as the application servers 14 using the HSM 20.

Initialization of the D-CaaS Microservice Application

Figure 5:
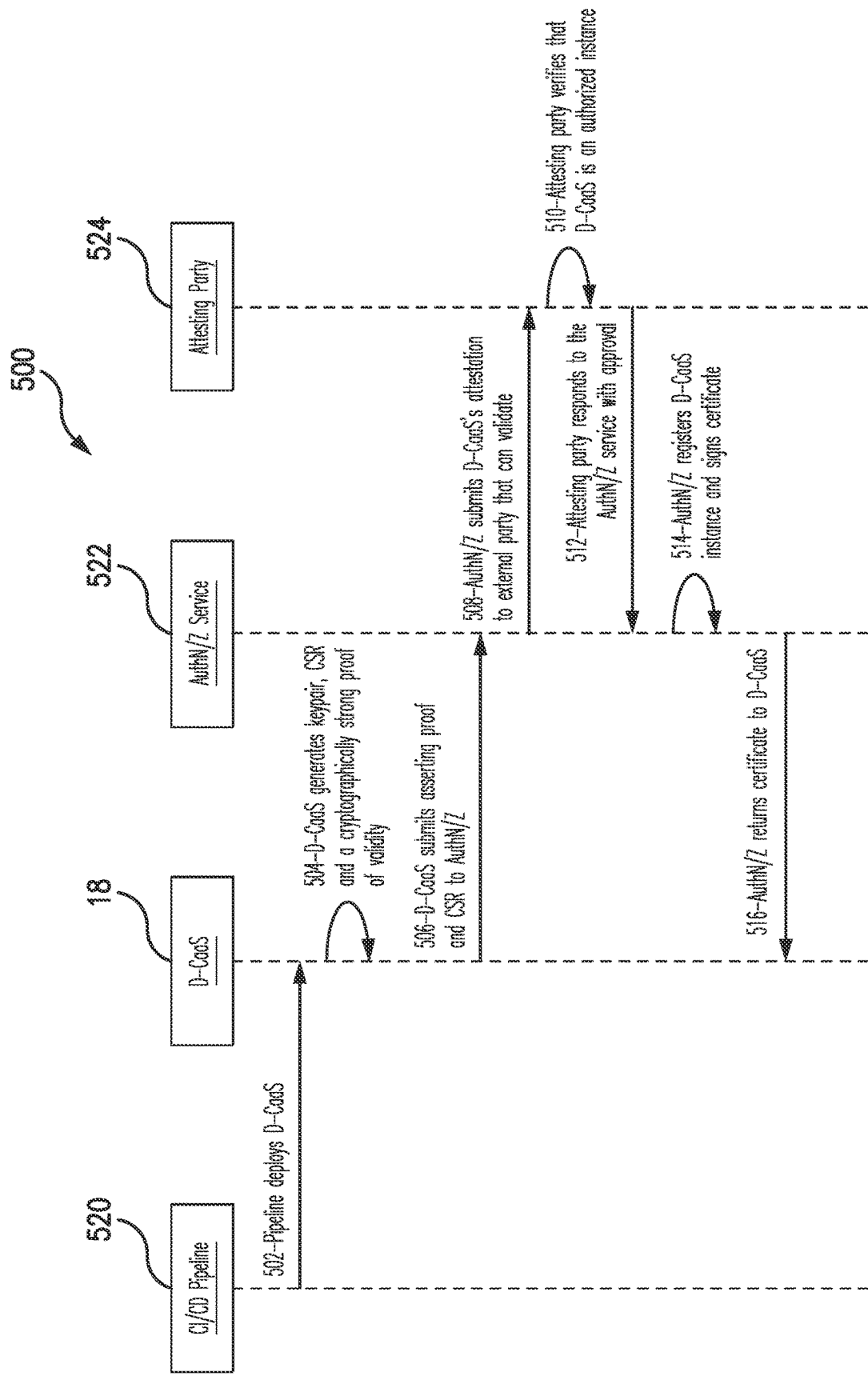
FIG. 5 is a sequence flow diagram depicting initialization of the D-CaaS microservice application, in accordance with one aspect of the present invention.

FIG. 5 is a sequence flow diagram 500 depicting initialization of the D-CaaS microservice application 18, in accordance with one aspect of the present invention. According to some aspects of the present invention, the sequence of operations of the flow diagram 500 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 is initialized in an environment where secure processing exists. In this instance where the D-CaaS microservice application 18 will run on trusted computing with a trusted execution environment (TEE) or a secure enclave (SE), the D-CaaS microservice application 18 may rely on a cryptographic key previously assigned to the system, such as the application server 14, as its means for asserting its identity to an authentication and authorization service 522 (broadly, a trust anchor or authentication and authorization computing system). This may be done by the presentation of a signed credential, a certificate signing request or any other cryptographic function where proof of access to the secret/private key is asserted.

In the example embodiment, the server system 16 (shown in FIG. 1) may include a continuous integration and continuous delivery (CI/CD) system, which may comprise any necessary tools for operation of a CI/CD pipeline 520 within the system 10 (shown in FIG. 1). At operation 502, the CI/CD pipeline 520 may instantiate an instance of the D-CaaS microservice application 18, for example, on a respective application server 14 (shown in FIG. 1). That is, the respective application server 14 may receive a command from the CI/CD pipeline 520 to launch the instance of the D-CaaS microservice application 18. More particularly, the CI/CD pipeline 520 may instruct the application server 14 to launch the D-CaaS microservice application 18 in an environment where a secure enclave can be established; that is, an area where the D-CaaS microservice application 18 can run in a heightened level of security. In such an environment, the D-CaaS microservice application 18 may function like a hardware security module (HSM). In one embodiment, such an environment implements Intel SGX (or Software Guard Extensions). Thus, after the application server 14 launches the D-CaaS microservice application 18 in response to the received command (i.e., after the D-CaaS microservice application 18 is started), it is aware that it is running on an SGX enabled system. The D-CaaS microservice application 18 may build, via a processor of the application server (such as the processor 302), a secure enclave, such as the secure enclave 310 (shown in FIG. 3).

At operation 504, the D-CaaS microservice application 18 generates a public/private key pair inside the secure enclave; a certificate signing request (CSR), signed with the private key; and a cryptographically strong proof of the validity of the secure enclave. In this embodiment, the D-CaaS microservice application 18 may attest itself by a combination of something it has and something it is. Using the Intel SGX architecture, for example, the D-CaaS microservice application 18 may build a cryptogram inside the secure enclave that represents a virtual fingerprint of itself that can be verified by an external attesting party 524 (or attesting party computing system) that proves that the D-CaaS microservice application 18 had access to sensitive keys on the processor itself, such as the cryptographic key previously assigned to the system. The cryptogram may be digitally signed or encrypted with the cryptographic key previously assigned to the system, for example, when building the secure enclave.

In the example embodiment, the key pair may consist of a private key and a corresponding public key. The private key remains securely stored within the secure enclave, while the public key may be shared. The D-CaaS microservice application 18 generates the CSR, which contains information about the secure enclave, such as its public key and identifying details. The D-CaaS microservice application 18 signs the CSR using the private key, ensuring that the CSR's authenticity can be verified using the public key. To provide the cryptographic proof of the validity of the secure enclave, the D-CaaS microservice application 18 can generate a cryptographic attestation or cryptogram. This cryptogram is a strong cryptographic statement about the integrity and authenticity of the secure enclave. The cryptogram typically involves creating a digital signature over the measurement of the secure enclave or other relevant data. The measurement ensures that the secure enclave code and data have not been modified, while the digital signature proves the authenticity of the attestation.

At operation 506, the D-CaaS microservice application 18 transmits the CSR and the cryptographically strong proof of validity (e.g., the cryptogram) to the authentication and authorization service 522. In an example embodiment, the authentication and authorization service 522 may be the CaaS system 412. Alternatively, in some embodiments, the authentication and authorization service 522 may include a centralized key management system (KMS). Examples of a centralized KMS include, without limitation, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

At operation 508, the authentication and authorization service 522 transmits the CSR and the cryptographically strong proof of the validity to the attesting party 524. Upon receipt of the CSR and the cryptogram (i.e., the cryptographically strong proof of validity), at operation 510, the attesting party 524, acting as the attestation verifier, verifies the integrity and authenticity of the cryptogram by checking the digital signature using the D-CaaS microservice application 18 public key. The attesting party 524 may also verify the secure enclave measurements to ensure the secure enclave has not been tampered with.

Upon verifying that the D-CaaS microservice application 18 is an authorized instance on a verified secure enclave, at operation 512, the attesting party 524 transmits an approval message to the authentication and authorization service 522. At operation 514, the authentication and authorization service 522 registers the instance of the D-CaaS microservice application 18, for example, in the database 44. That is, the authorized and authenticated instance of the D-CaaS microservice application 18 is included in a database list and includes the Distinguished Name (DN) of the business application (broadly, a custodian application) authorized to call the services it provides. The calling business application would need to have issued to it a properly signed and configured certificate. Therefore, in order for the business application to leverage the services of the D-CaaS microservice application 18, the business application will first need to be a registered tenant on the authentication and authorization service 522 (e.g., the CaaS system 412) with at least one master-level tenant key.

At operation 516, the authentication and authorization service 522 may issue a certificate to the D-CaaS microservice application 18. The certificate is a digitally signed document that binds the D-CaaS microservice application 18 public key to its identity or unique identifier. This serves as a trusted proof of the validity of the D-CaaS microservice application 18 and can be used to establish secure communication or other interactions with the D-CaaS microservice application 18 and/or secure enclave.

By generating a key pair, creating a CSR, and providing a cryptographic proof of validity, the enclave-based D-CaaS microservice application 18 may demonstrate its integrity and authenticity to the authentication and authorization service 522 and attesting party 524. This process helps establish trust between the D-CaaS microservice application 18 and the authentication and authorization service 522 and/or attesting party 524, enabling secure interactions and the establishment of secure channels.

Figure 6:
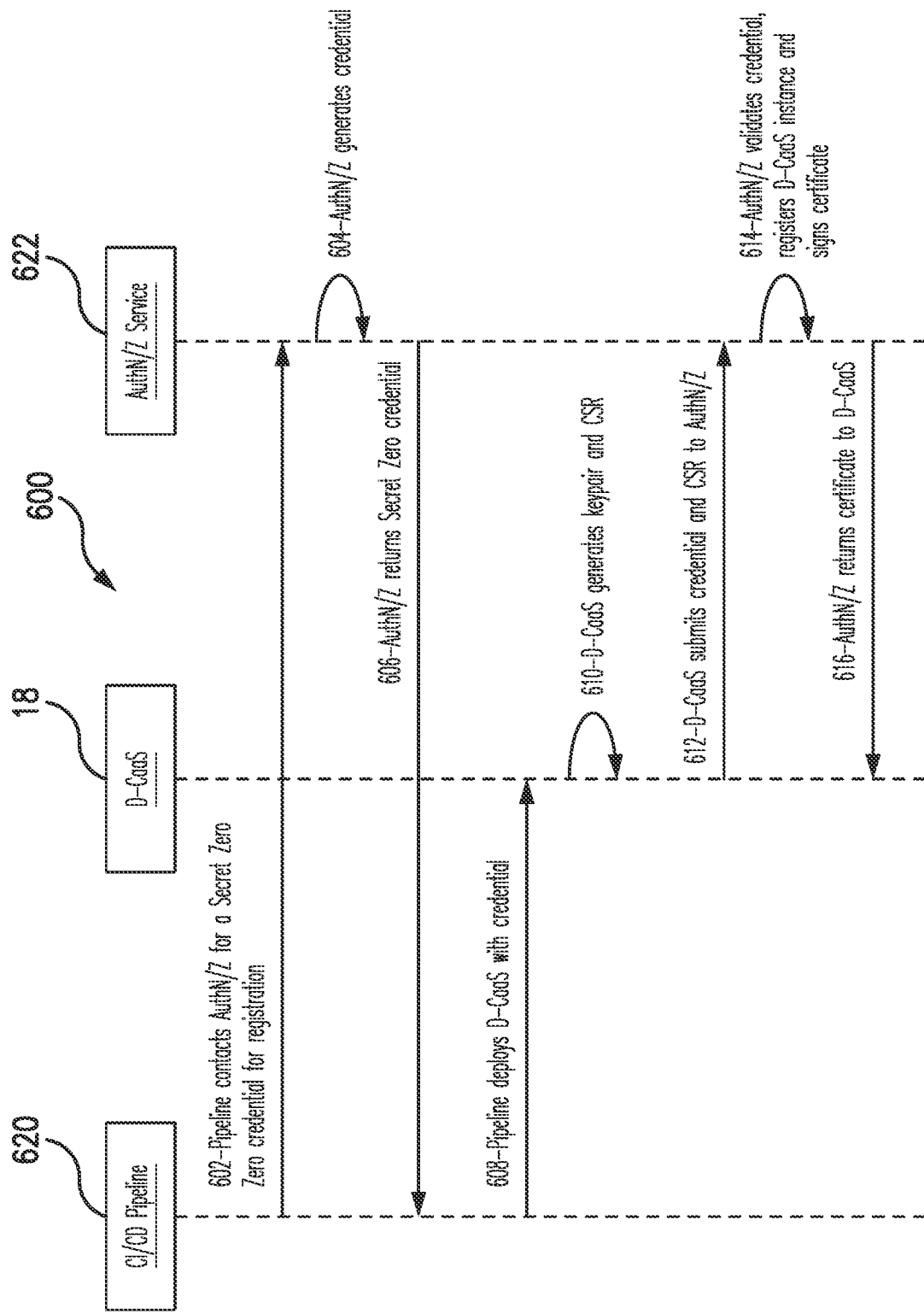
FIG. 6 is a sequence flow diagram depicting initialization of the D-CaaS microservice application using a CI/CD pipeline, in accordance with another aspect of the present invention.

FIG. 6 is a sequence flow diagram 600 depicting initialization of the D-CaaS microservice application 18 using a CI/CD pipeline 620, in accordance with another aspect of the present invention. According to some aspects of the present invention, the sequence of operations of the flow diagram 600 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 is initialized in an environment where secure processing does not exist. In the instance where the D-CaaS microservice application 18 will run in an environment without a TPM, TEE, or SE, the application 18 may build a "white-box" cryptographic enclave, or a mechanism for protecting secret material that is entirely dependent on software. In some embodiments, the "white-box" cryptographic enclave is generated in a virtual machine running on the application server 14.

A "white-box" enclave, also known as a white-box cryptographic implementation or a white-box attack-resistant enclave, refers to a secure execution environment that is designed to protect cryptographic operations even when an attacker has complete access to the internal workings of the enclave. In traditional security models, cryptographic algorithms are assumed to be executed within a black box, where the internal state and computations are hidden from an attacker, as described in the sequence flow diagram 500 depicted in FIG. 5. However, in this embodiment, an attacker may gain full access to the underlying software or hardware of the system. A "white-box" enclave addresses this vulnerability by implementing additional countermeasures to protect the cryptographic operations. The white-box cryptographic implementation employs techniques such as code obfuscation, encryption, and randomization to make it extremely difficult for an attacker to reverse-engineer the cryptographic algorithms or extract sensitive information from the enclave. These techniques facilitate hiding the internal state and computations of the enclave, making it resistant to various attacks.

In the example embodiment, because a prior mechanism for securing a private or secret key does not exist, the D-CaaS microservice application 18 may rely on a trusted orchestrator, such as the CI/CD pipeline 620, to provide a short-lived and one-time use credential. As used herein, the term "short-lived" includes a lifetime of no more than a threshold period of time (e.g., one minute, one hour, one day, or another time interval) before expiring or becoming invalid. The D-CaaS microservice application 18 may present the short-lived and one-time use credential to an authentication and authorization service 622 during initialization to assert its identity. In one embodiment, the authentication and authorization service 622 may be the CaaS system 412 (shown in FIG. 4). Alternatively, in some embodiments, the authentication and authorization service 622 may include a centralized key management system (KMS). Examples of a centralized KMS include, without limitation, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

In the example embodiment, the server system 16 (shown in FIG. 1) may include a continuous integration and continuous delivery (CI/CD) system, which may comprise any necessary tools for operation of a CI/CD pipeline 620 within the system 10 (shown in FIG. 1). At operation 602, the CI/CD pipeline 620 may communicate with the authentication and authorization service 622 and may request a "secret zero" credential for registration of the D-CaaS microservice application 18. At operation 604, the authentication and authorization service 622 generates the "secret zero" credential for registration of the D-CaaS microservice application 18. Furthermore, at operation 606, the authentication and authorization service 622 transmits the "secret zero" credential to the CI/CD pipeline 620.

At operation 608, the CI/CD pipeline 620 may instantiate an instance of the D-CaaS microservice application 18 with the "secret zero" credential on a respective application server 14 (shown in FIG. 1). More particularly, the CI/CD pipeline 620 may launch the D-CaaS microservice application 18, with the "secret zero" credential, in an environment where a secure enclave cannot be established. The D-CaaS microservice application 18 may build a "white-box" cryptographic enclave.

At operation 610, the D-CaaS microservice application 18 generates a public/private key pair and a certificate signing request (CSR). In this example embodiment, the key pair may consist of a private key and a corresponding public key. The private key remains securely stored within the "white-box" cryptographic enclave, while the public key may be shared. The D-CaaS microservice application 18 may generate the CSR, which contains information about the "white-box" cryptographic enclave, such as the public key. The D-CaaS microservice application 18 signs the CSR using the private key, ensuring that the CSR's authenticity can be verified using the public key.

At operation 612, the D-CaaS microservice application 18 transmits the CSR and the "secret zero" credential to the authentication and authorization service 622. In the example, the "secret zero" credential includes, for example, a token or other credential that the D-CaaS microservice application 18 may provide to the authentication and authorization service 622 after the D-CaaS microservice application 18 launches.

At operation 614, the authentication and authorization service 622 validates the instance of the D-CaaS microservice application 18. More particularly, the authentication and authorization service 622 validates the "secret zero" credential, for example, by comparing the "secret zero" credential received by the authentication and authorization service 622 from the D-CaaS microservice application 18 to the "secret zero" credential generated by the authentication and authorization service 622 and transmitted to the CI/CD pipeline 620. A match of the two (2) credentials may result in a successful authorization and authentication of the D-CaaS microservice application 18. Furthermore, the authentication and authorization service 622 registers the instance of the D-CaaS microservice application 18, for example, in the database 44. That is, the authorized and authenticated instance of the D-CaaS microservice application 18 is included in a database list and includes the Distinguished Name (DN) of the business application (broadly, a custodian application) authorized to call the services it provides. The calling business application would need to have issued to it a properly signed and configured certificate. Therefore, in order for the business application to leverage the services of the D-CaaS microservice application 18, the business application will first need to be a registered tenant on the authentication and authorization service 622 (e.g., the CaaS system 412) with at least one master-level tenant key.

At operation 616, the authentication and authorization service 622 may issue a certificate to the D-CaaS microservice application 18. The certificate is a digitally signed document that binds the D-CaaS microservice application 18 public key to its identity. This serves as a trusted proof of the validity of the D-CaaS microservice application 18 and can be used to establish secure communication or other interactions with the D-CaaS microservice application 18 and/or the "white-box" cryptographic enclave.

By generating a key pair and creating a CSR, the D-CaaS microservice application 18 may demonstrate its integrity and authenticity to the authentication and authorization service 622. This process helps establish trust between the D-CaaS microservice application 18 and the authentication and authorization service 622, enabling secure interactions and the establishment of secure channels.

Figure 7:
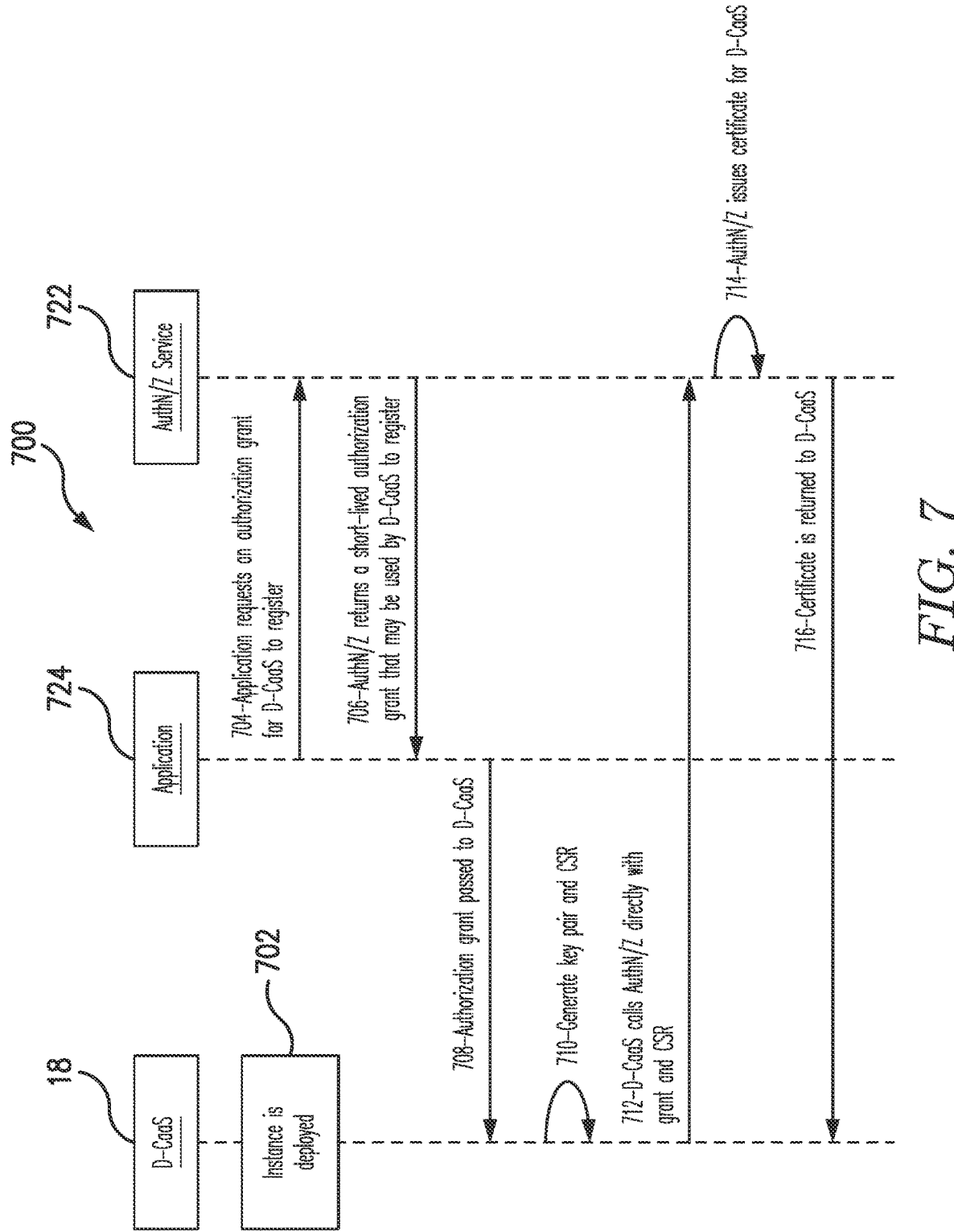
FIG. 7 is a sequence flow diagram depicting initialization of a D-CaaS microservice application via a business application (broadly, a custodian application), in accordance with an aspect of the present invention.

FIG. 7 is a sequence flow diagram 700 depicting initialization of the D-CaaS microservice application 18 via a business application 724 (broadly, a custodian application), in accordance with an aspect of the present invention. According to some aspects of the present invention, the sequence of operations of the flow diagram 700 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 is initialized by the business application 724 in an environment where secure processing does not exist. As discussed above with respect to FIG. 6, in the instance where the D-CaaS microservice application 18 will run in an environment without a TPM, TEE, or SE, the application 18 may build a "white-box" cryptographic enclave, or a mechanism for protecting secret material that is entirely dependent on software. In some embodiments, the "white-box" cryptographic enclave is generated in a virtual machine running on the application server 14. In this example embodiment, because a prior mechanism for securing a private or secret key does not exist, the D-CaaS microservice application 18 may rely on the business application 724 to provide a short-lived and one-time use credential.

After initialization, the D-CaaS microservice application 18 may present the short-lived and one-time use credential to an authentication and authorization service 722 to assert its identity after initialization. In one embodiment, the authentication and authorization service 722 may be the CaaS system 412 (shown in FIG. 4). Alternatively, in some embodiments, the authentication and authorization service 722 may include a centralized key management system (KMS). Examples of a centralized KMS include, without limitation, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

In the example embodiment, at operation 702, the business application 724 may deploy or instantiate an instance of the D-CaaS microservice application 18. Upon deployment, the D-CaaS microservice application 18 may build the "white-box" cryptographic enclave in the memory of the application server 14, and in some embodiments, within a virtual machine running in memory of the application server 14.

At operation 704, the business application 724 may communicate with the authentication and authorization service 722 and may transmit a request message requesting an authorization grant for registration of the D-CaaS microservice application 18. The authentication and authorization service 722 may generate a short-lived authorization grant that may be used by the D-CaaS microservice application 18 to register with the authentication and authorization service 722. At operation 706, the authentication and authorization service 722 may transmit the authorization grant to the business application 724 in response to the request message.

At operation 708, the business application 724 transmits the authorization grant to the D-CaaS microservice application 18. Upon receiving the authorization grant, the D-CaaS microservice application 18 generates a public/private key pair and a certificate signing request (CSR), as depicted at operation 710. The key pair may consist of a private key and a corresponding public key. The private key remains securely stored within the "white-box" cryptographic enclave, while the public key may be shared. The D-CaaS microservice application 18 may generate the CSR, which contains information about the "white-box" cryptographic enclave, such as the public key. The D-CaaS microservice application 18 signs the CSR using the private key, ensuring that the CSR's authenticity can be verified using the public key.

At operation 712, the D-CaaS microservice application 18 transmits the CSR and the authorization grant to the authentication and authorization service 722. In the example, the authorization grant may include, for example, a token or other credential that the D-CaaS microservice application 18 may provide to the authentication and authorization service 722 after the D-CaaS microservice application 18 launches.

At operation 714, the authentication and authorization service 722 validates the instance of the D-CaaS microservice application 18. More particularly, the authentication and authorization service 722 validates the authorization grant in substantially the same manner as described above with respect to the "secret zero" credential discussed in FIG. 6. Furthermore, the authentication and authorization service 722 registers the instance of the D-CaaS microservice application 18, for example, in the database 44. That is, the authorized and authenticated instance of the D-CaaS microservice application 18 is included in a database list and includes the Distinguished Name (DN) of the business application 724 that instantiated the D-CaaS microservice application 18. The calling business application 724 would need to have issued to it a properly signed and configured certificate. Therefore, in order for the business application 724 to leverage the services of the D-CaaS microservice application 18, the business application 724 will first need to be a registered tenant on the authentication and authorization service 722 (e.g., CaaS system 412) with at least one master-level tenant key.

At operation 716, the authentication and authorization service 722 may issue a certificate to the D-CaaS microservice application 18. The certificate is a digitally signed document that binds the D-CaaS microservice application 18 public key to its identity. This serves as a trusted proof of the validity of the D-CaaS microservice application 18 and can be used to establish secure communication or other interactions with the D-CaaS microservice application 18 and/or the "white-box" cryptographic enclave.

By generating a key pair and creating a CSR, the D-CaaS microservice application 18 may demonstrate its integrity and authenticity to the authentication and authorization service 722. This process helps establish trust between the D-CaaS microservice application 18 and the authentication and authorization service 722, enabling secure interactions and the establishment of secure channels.

Key Loading for the D-CaaS Microservice Application

As described herein, the D-CaaS microservice application 18 may function as a secure cryptography engine. For many operations, the D-CaaS microservice application 18 may assume that the associated business application (broadly, a custodian application) handles key management, including key creation, lifespan, and renewal. While the custodian application may own key management for its own keys, the custodian application may not be provided access to the keys in clear text; rather, the custodian application may only archive the keys in an encrypted format and/or grant access to the keys to the D-CaaS microservice application 18. The D-CaaS microservice application 18 may be the only authorized application to recover the clear text keys.

After an instance of the D-CaaS microservice application 18 has been instantiated and validated, the D-CaaS microservice application 18 may contact a trust anchor, such as a centralized key management system (KMS) or the CaaS system 412 (shown in FIG. 4) to load all keys to which the D-CaaS microservice application 18 may be entitled to access. The various ways that the D-CaaS microservice application 18 may do so are described in detail below.

Figure 8:
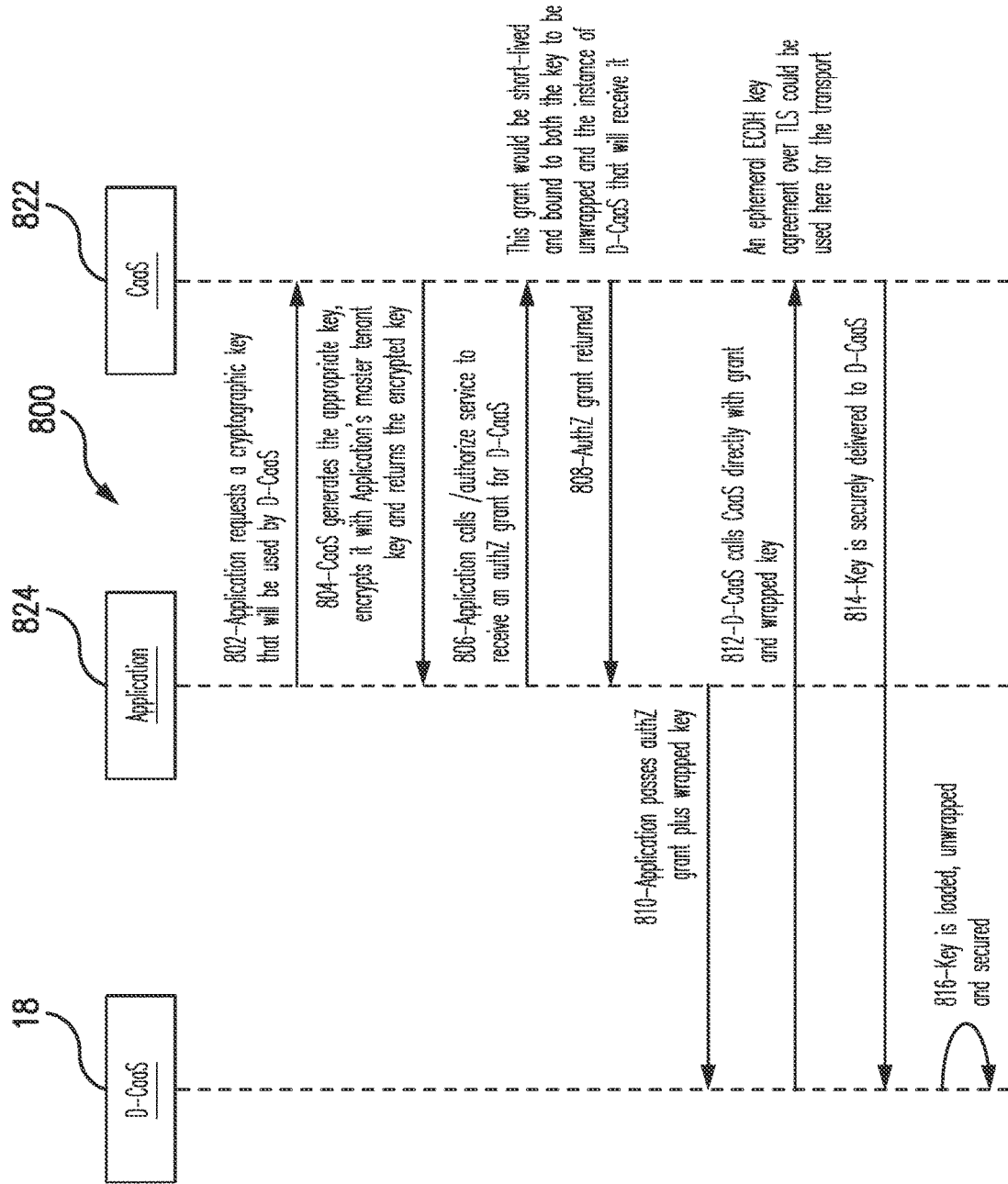
FIG. 8 is a sequence flow diagram depicting a key loading process for a D-CaaS microservice application, in accordance with one aspect of the present invention.

FIG. 8 is a sequence flow diagram 800 depicting a key loading process for the D-CaaS microservice application 18, in accordance with one aspect of the present invention. According to some aspects of the present invention, the sequence of operations of the flow diagram 800 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 has been instantiated, as described above, and is bound to the custodian application 824 (i.e., the business application). The key loading process includes, for example, securely retrieving one or more cryptographic keys required for performing cryptographic services from a centralized key management system (KMS), such as the CaaS system 412 (shown in FIG. 4). As described herein, the centralized KMS may include, without limitation, the CaaS system 412, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

As noted above, the custodian application 824 would need to have issued to it a properly signed and configured certificate. Therefore, in order for the custodian application 824 to leverage the services of the D-CaaS microservice application 18, the custodian application 824 will first need to be a registered tenant on the centralized KMS 822 with at least one master-level tenant key.

At operation 802, the custodian application 824, which needs one or more cryptographic data encryption keys to perform cryptographic operations, may initiate or transmit a request to a centralized key management system (KMS), such as the centralized KMS 822, requesting one or more data encryption keys for use by the D-CaaS microservice application 18. The request may include identification information to authenticate and authorize the custodian application 824.

At operation 804, the centralized KMS 822 may generate and/or retrieve the one or more data encryption keys requested by the custodian application 824, may encrypt the data encryption key(s), and may transmit the encrypted data encryption key(s) to the requesting custodian application 824. More particularly, upon receipt of the request from the custodian application 824, the centralized KMS 822 may authenticate and authorize the custodian application 824, for example, to ensure that the custodian application 824 is a registered tenant on the centralized KMS 822. After generating and or retrieving the requested data encryption key(s), the centralized KMS 822 may encrypt the data encryption key(s) with the master-level tenant key associated with the custodian application 824.

After receiving the data encryption key(s), the custodian application 824 may be responsible for storing the encrypted data encryption key(s), until needed. The custodian application 824 may store the encrypted data encryption key(s) in a memory, an archive, etc., such as the storage device 326 (shown in FIG. 3). In some embodiments, the data encryption key(s) may contain metadata including, for example, a key identifier (ID), a key version, key access controls, key policy data, and/or other key metadata. A key ID may be a unique identifier or name assigned to the data encryption key for identification purposes. The key ID may facilitate in distinguishing, retrieving, and/or calling the correct data encryption key. In embodiments where key rotation and/or key updates may be implemented, a key version number and/or timestamp may be included to track different iterations of the data encryption key(s). As such, the key version may facilitate proper management and handling of data encryption key updates. Access control information may include data specifying who has permission to access and/or use the data encryption key(s). This data may include user roles, groups, and/or specific individuals who are authorized to use the key for encryption and/or decryption operations. Policy data may include security policies that are associated with the data encryption key(s), such as permitted cryptographic algorithms, key length, and/or other security parameters that govern usage of the data encryption key(s) and ensure compliance with predetermined security standards or protocols. Furthermore, other key metadata may include additional information about the data encryption key(s), such as creation date, expiration date, owner, purpose, and/or any other attributes that provide context and/or specific requirements for usage of the data encryption key(s).

In the example embodiment, at operation 806, the custodian application 824 may initiate or transmit an authorization request to the centralized KMS 822 requesting an authorization grant for the D-CaaS microservice application 18 bound to the custodian application 824. The authorization request may include, for example, the encrypted data encryption key(s) and an identifier of the D-CaaS microservice application 18 bound to the custodian application 824. The authorization grant may be short-lived (e.g., valid for one minute, one hour, one day, or another time interval) and bound to both the encrypted data encryption key(s) and the D-CaaS microservice application 18 bound to the custodian application 824. The authorization grant includes data that may bind the grant to the D-CaaS microservice application 18 and the custodian application 824, and authorizes the D-CaaS microservice application 18 to load the associated data encryption key(s). In some embodiments, the authorization grant may include a token or credential that proves the D-CaaS microservice application's 18 identity and permissions.

At operation 808, the centralized KMS 822 may transmit the authorization grant to the custodian application 824 and may store a copy of the authorization grant, for example, in a database, such as the database 44 (shown in FIG. 2). The stored copy may be used by the centralized KMS 822 to validate a subsequent request from a requesting party, where the request includes the authorization grant. At operation 810, the custodian application 824 may transmit the authorization grant and the encrypted data encryption key(s) to the D-CaaS microservice application 18.

At operation 812, the D-CaaS microservice application 18 may initiate or transmit an authorization grant request to the centralized KMS 822. The authorization grant request may include the identity of the D-CaaS microservice application 18 and any necessary authentication information, such as a certificate issued to the D-CaaS microservice application 18 during initialization (as discussed above at operations, 516, 616, and/or 716), API keys, and/or access tokens. Furthermore, the authorization grant request may include the encrypted data encryption key(s) along with a request that the centralized KMS 822 decrypt the data encryption key(s) and return them to the D-CaaS microservice application 18. The centralized KMS 822 may validate the authorization grant by checking its authenticity against the stored authorization grant, verifying the identity of the D-CaaS microservice application 18 (via the certificate, for example), and permissions.

After validating the authorization grant, in an embodiment, the D-CaaS microservice application 18 and the centralized KMS 822 may negotiate a secure communication channel for the transport of the decrypted data encryption key(s). For example, and without limitation, the D-CaaS microservice application 18 and the centralized KMS 822 may negotiate an ephemeral Elliptic Curve Diffie-Hellman (ECDH) key agreement over Transport Layer Security (TLS) for the secure channel. With an ephemeral ECDH key agreement over TLS, the D-CaaS microservice application 18 and the centralized KMS 822 may create temporary public/private key pairs for the TLS or SSL (Secure Socket Layer) session. The D-CaaS microservice application 18 and the centralized KMS 822 may exchange these keys during the TLS handshake. Using their own private key and the other party's public key, the D-CaaS microservice application 18 and the centralized KMS 822 compute a shared secret. The shared secret is used to generate the communication encryption keys for secure communication.

At operation 814, the centralized KMS 822 may decrypt the data encryption key(s) and securely transmit them to the D-CaaS microservice application 18 via the negotiated secure channel. For example, the instead of directly sending the decrypted data encryption key(s) to the D-CaaS microservice application 18, the centralized KMS 822 may encrypt the data encryption key(s) using the communication encryption keys, creating a wrapped key(s). The centralized KMS 822 may send the wrapped key(s) back to the D-CaaS microservice application 18. Because the wrapped key(s) is encrypted using the communication encryption keys, only the D-CaaS microservice application 18 possessing the corresponding communication encryption keys can decrypt and unwrap the wrapped key(s).

At operation 816, after receiving the wrapped key(s), the D-CaaS microservice application 18 may use the corresponding communication encryption keys to decrypt and unwrap the wrapped key(s). The D-CaaS microservice application 18 then has the unwrapped data encryption key(s) and may securely store and use the data encryption key(s) for performing various cryptographic operations requested by the custodian application 824.

Figure 9:
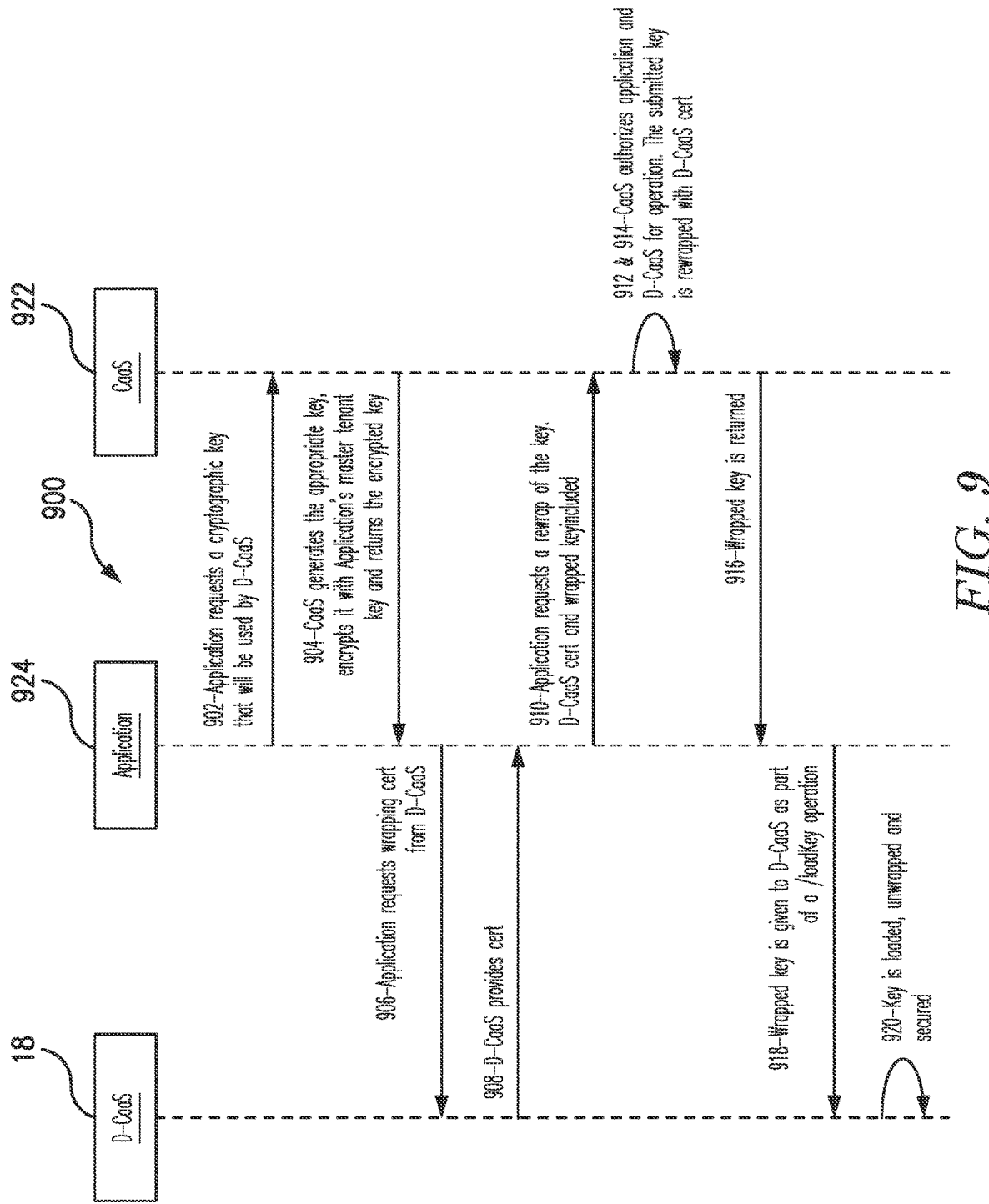
FIG. 9 is a sequence flow diagram depicting another key loading process for a D-CaaS microservice application, in accordance with another aspect of the present invention.

FIG. 9 is a sequence flow diagram 900 depicting another key loading process for the D-CaaS microservice application 18, in accordance with another aspect of the present invention. According to some aspects of the present invention, the sequence of operations of the flow diagram 900 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 has been instantiated, as described above, and is bound to the custodian application 924 (i.e., the business application). The key loading process includes, for example, securely retrieving one or more cryptographic keys required for performing cryptographic services from a centralized key management system (KMS), such as CaaS 412 (shown in FIG. 4). As described herein, the centralized KMS may include, without limitation, the CaaS system 412, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

As noted above, the custodian application 924 would need to have issued to it a properly signed and configured certificate. Therefore, in order for the custodian application 924 to leverage the services of the D-CaaS microservice application 18, the custodian application 924 will first need to be a registered tenant on the centralized KMS 922 with at least one master-level tenant key.

At operation 902, the custodian application 924 may initiate or transmit a request to a centralized key management system (KMS), such as the centralized KMS 922, requesting one or more data encryption keys for use by the D-CaaS microservice application 18. The request may include identification information to authenticate and authorize the custodian application 924.

At operation 904, the centralized KMS 922 may generate and/or retrieve the one or more data encryption keys requested by the custodian application 924, may encrypt the data encryption key(s), and may transmit the encrypted data encryption key(s) to the requesting custodian application 924. More particularly, upon receipt of the request from the custodian application 924, the centralized KMS 922 may authenticate and authorize the custodian application 924, for example, to ensure that the custodian application 924 is a registered tenant on the centralized KMS 922. After generating and or retrieving the requested data encryption key(s), the centralized KMS 922 may encrypt the data encryption key(s) with the master-level tenant key associated with the custodian application 924.

After receiving the data encryption key(s), the custodian application 924 may be responsible for storing the encrypted data encryption key(s), until needed. The custodian application 924 may store the encrypted data encryption key(s) in a memory, an archive, etc., such as the storage device 326 (shown in FIG. 3). In some embodiments, the data encryption key(s) may contain metadata including, for example, a key identifier (ID), a key version, key access controls, key policy data, and/or other key metadata, as discussed above with respect to sequence flow diagram 900.

In the example embodiment, at operation 906, the custodian application 924 may initiate or transmit a wrapping certificate request to the D-CaaS microservice application 18 requesting a wrapping certificate from the D-CaaS microservice application 18. At operation 908, the D-CaaS microservice application 18 may transmit its wrapping certificate to the custodian application 924. The wrapping certificate may include, for example, the certificate issued to the D-CaaS microservice application 18 during initialization (as discussed above at operations, 516, 616, and/or 716).

At operation 910, the custodian application 924 may initiate or transmit a rewrap request to the centralized KMS 922 requesting a rewrap of the encrypted data encryption key(s). The rewrap request may include the encrypted data encryption key(s) and the wrapping certificate of the D-CaaS microservice application 18. It is noted that the wrapping certificate may identify the D-CaaS microservice application 18 that is bound to the custodian application 924.

At operation 912, the centralized KMS 922 may authenticate and authorize the custodian application 924 and the D-CaaS microservice application 18 to receive and use the data encryption key(s). Furthermore, at operation 914, the centralized KMS 922 may decrypt the data encryption key(s) using the master-level tenant key associated with the custodian application 924, and rewrap the data encryption key(s) using the wrapping certificate of the D-CaaS microservice application 18. At operation 916, the centralized KMS 922 may transmit the rewrapped data encryption key(s) to the custodian application 924. Furthermore, at operation 918, the custodian application 924 may transmit the rewrapped data encryption key(s) to the D-CaaS microservice application 18. Because the rewrapped data encryption key(s) is encrypted using the wrapping certificate of the D-CaaS microservice application 18, the D-CaaS microservice application 18 can decrypt and unwrap the rewrapped data encryption key(s) using its private key associated with its wrapping certificate.

At operation 920, after receiving the rewrapped data encryption key(s), the D-CaaS microservice application 18 may use the wrapping certificate to decrypt and unwrap the rewrapped data encryption key(s). The D-CaaS microservice application 18 then has the unwrapped data encryption key(s) and may securely store and use the data encryption key(s) for performing various cryptographic operations requested by the custodian application 924.

Figure 10:
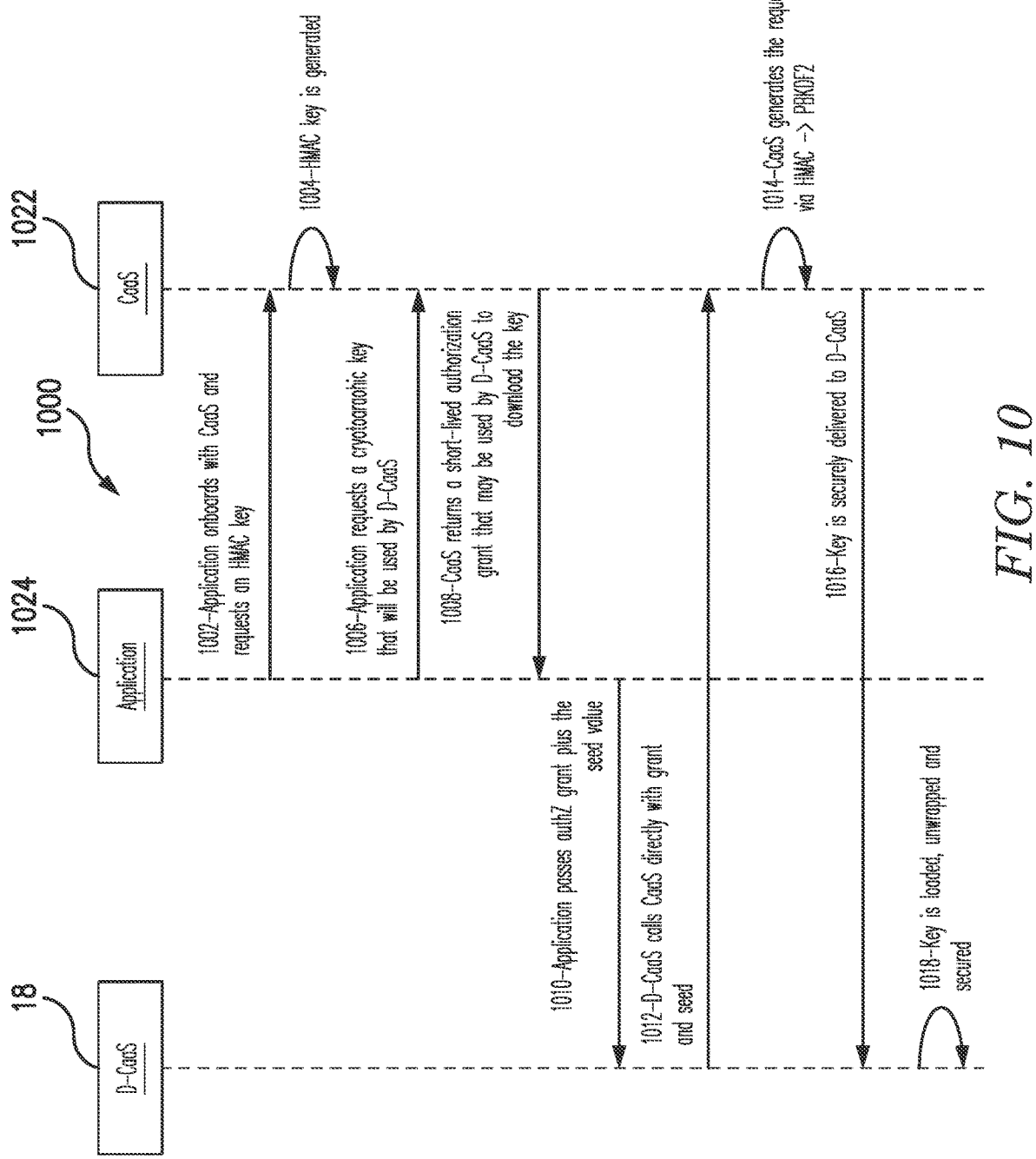
FIG. 10 is a sequence flow diagram depicting a key loading process for a D-CaaS microservice application, in accordance with an aspect of the present invention.

FIG. 10 is a sequence flow diagram 1000 depicting a key loading process for the D-CaaS microservice application 18, in accordance with an aspect of the present invention. According to some aspects of the present invention, the sequence of operations of the flow diagram 1000 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 has been instantiated, as described above, and is bound to the custodian application 1024 (i.e., the business application). The key loading process includes, for example, securely retrieving one or more cryptographic keys required for performing cryptographic services from a centralized key management system (KMS), such as CaaS 412 (shown in FIG. 4), using a seed value. As described herein, the centralized KMS may include, without limitation, the CaaS system 412, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

At operation 1002, the custodian application 1024 may register with a centralized KMS 1022 to become a registered tenant on the centralized KMS 1022. During the registration process, the custodian application 1024 may request a hash-based message authentication code (HMAC) key. At operation 1004, the centralized KMS 1022 may generate an HMAC key for the custodian application 1024. An HMAC key refers to a key used for generating HMAC values. HMAC is a cryptographic technique that combines a secret key with a hash function to produce a digital signature or message authentication code for data integrity and authenticity verification.

At operation 1006, the custodian application 1024 may initiate or transmit a request to the centralized KMS 1022 requesting one or more data encryption keys for use by the D-CaaS microservice application 18. The request may include identification information to authenticate and authorize the custodian application 1024 and the D-CaaS microservice application 18 bound to the custodian application 1024. Furthermore, the request may include a seed file, seed data elements, and/or a seed value. In the example, the custodian application 1024 may be responsible for the generation and storage of the seed file, seed data elements, and/or a seed value.

In the example embodiment, at operation 1008, the centralized KMS 1022 may transmit an authorization grant to the custodian application 1024 and may store a copy of the authorization grant, for example, in a database, such as the database 44 (shown in FIG. 2). The stored copy may be used by the centralized KMS 1022 to validate a subsequent request from a requesting party, where the request includes the authorization grant. The authorization grant may be short-lived (e.g., valid for one minute, one hour, one day, or another time interval) and bound to the D-CaaS microservice application 18 bound to the custodian application 1024. The authorization grant may include data that may bind the grant to the D-CaaS microservice application 18 and the custodian application 1024. In some embodiments, the authorization grant may include a token or credential that proves the D-CaaS microservice application's 18 identity and permissions. At operation 1010, the custodian application 1024 may transmit the authorization grant and the seed file, seed data elements, and/or the seed value to the D-CaaS microservice application 18.

At operation 1012, the D-CaaS microservice application 18 may initiate or transmit an authorization grant request to the centralized KMS 1022. The authorization grant request may include the identity of the D-CaaS microservice application 18 and any necessary authentication information, such as a certificate issued to the D-CaaS microservice application 18 during initialization (as discussed above at operations, 516, 616, and/or 716), API keys, and/or access tokens. Furthermore, the authorization grant request may include the seed file, seed data elements, and/or the seed value. The centralized KMS 1022 may validate the authorization grant by checking its authenticity against the stored authorization grant, verifying the identity of the D-CaaS microservice application 18 (via the certificate, for example), and permissions.

After validating the authorization grant, in an embodiment, the D-CaaS microservice application 18 and the centralized KMS 1022 may negotiate a secure communication channel for the transport of the decrypted data encryption key(s). For example, and without limitation, the D-CaaS microservice application 18 and the centralized KMS 1022 may negotiate an ephemeral ECDH key agreement over TLS as discussed above with respect to the sequence flow diagram 800.

At operation 1014, the centralized KMS 1022 may generate a data encryption key(s) using the seed file via HMAC and the PBKDF2 (Password-Based Key Derivation Function 2) algorithm. For example, in an embodiment, using the HMAC algorithm (e.g., HMAC-SHA256), the centralized KMS 1022 may apply the HMAC key to the seed value. The seed value is a unique input used to derive the data encryption key(s). The seed value may be hashed with the HMAC key to produce an HMAC value. The HMAC key serves as the secret key for the HMAC operation. The HMAC value may be used as a "salt" input for the PBKDF2 algorithm. The PBKDF2 algorithm may be applied using the HMAC value as the salt to create a derived key based on the HMAC value and the seed value. The derived key is the data encryption key(s).

At operation 1016, the centralized KMS 1022 may securely transmit the data encryption key(s) to the D-CaaS microservice application 18 via the negotiated secure channel. For example, instead of directly sending the data encryption key(s) to the D-CaaS microservice application 18, the centralized KMS 1022 may encrypt the data encryption key(s) using the communication encryption keys, creating a wrapped key(s). The centralized KMS 1022 may send the wrapped key(s) back to the D-CaaS microservice application 18. Because the wrapped key(s) is encrypted using the communication encryption keys, only the D-CaaS microservice application 18 possessing the corresponding communication encryption keys can decrypt and unwrap the wrapped key(s).

At operation 1018, after receiving the wrapped key(s), the D-CaaS microservice application 18 may use the corresponding communication encryption keys to decrypt and unwrap the wrapped key(s). The D-CaaS microservice application 18 then has the unwrapped data encryption key(s) and may securely store and use the data encryption key(s) for performing various cryptographic operations requested by the custodian application 1024.

Figure 11:
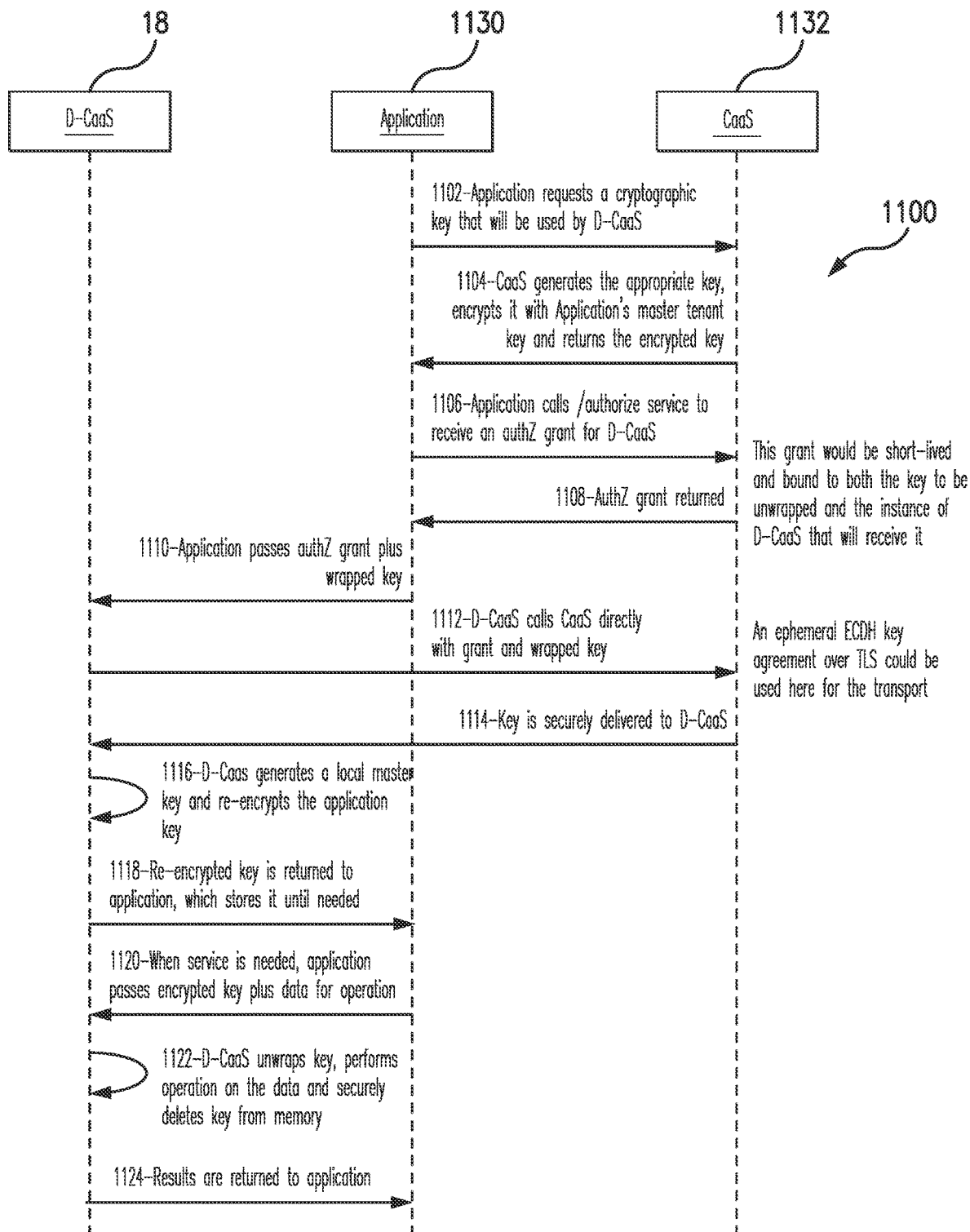
FIG. 11 is a sequence flow diagram depicting another key loading process for the D-CaaS microservice application, in accordance with an aspect of the present invention.

FIG. 11 is a sequence flow diagram 1100 depicting a key loading process for the D-CaaS microservice application 18, in accordance with an aspect of the present invention. According to some aspects of the present invention, the sequence of operations of the flow diagram 1100 may not necessarily be executed in the same order as depicted. Further, one or more operations may be grouped together and performed as a single step, or one operation may have several sub-steps that may be performed in parallel or in sequence.

In the example embodiment, the D-CaaS microservice application 18 has been instantiated, as described above, and is bound to the custodian application 1124 (i.e., the business application). The key loading process includes, for example, securely retrieving one or more cryptographic keys required for performing cryptographic services from a centralized key management system (KMS), such as the CaaS system 412 (shown in FIG. 4). As described herein, the centralized KMS may include, without limitation, the CaaS system 412, Amazon Web Services KMS, Google Cloud KMS, Microsoft Azure Key Vault, and any other KMS based on or using, for example, Public-Key Cryptography Standards (PKCS), REST embedding technology, Key Management Interoperability Protocol (KMIP), Java Cryptography Extension (JCE), Cryptography Next Generation (CNG), and the like.

As noted above, the custodian application 1130 would need to have issued to it a properly signed and configured certificate. Therefore, in order for the custodian application 1130 to leverage the services of the D-CaaS microservice application 18, the custodian application 1130 will first need to be a registered tenant on the centralized KMS 1132 with at least one master-level tenant key.

In this embodiment, the initial operations (i.e., operations 1102, 1104, 1106, 1108, 1110, 1112, and 1114) are substantially the same as the equivalent operations described above in sequence flow diagram 800 (i.e., operations 802, 804, 806, 808, 810, 812, and 814). As such, the specific operations will not again be described here.

In the example depicted in FIG. 11, at operation 1116, after the data encryption key(s) are received by the D-CaaS microservice application 18, the D-CaaS microservice application 18 may generate a local master key and re-encrypt the data encryption key(s) using the local master key. At operation 1118, the D-CaaS microservice application 18 may transmit the re-encrypted data encryption key(s) to the custodian application 1130. The D-CaaS microservice application 18 then securely deletes the re-encrypted data encryption key(s) from memory. In this manner, the D-CaaS microservice application 18 may not load the data encryption key(s) for persistence in memory and therefore may function similar to an HSM.

At operation 1120, the D-CaaS microservice application 18 may receive a cryptographic service request from the custodian application 1130. The cryptographic service request may include a request to perform a cryptographic operation, the re-encrypted data encryption key(s), and data for use in the requested cryptographic operation. At operation 1122, the D-CaaS microservice application 18 decrypts the re-encrypted data encryption key(s) using the local master key, performs the requested cryptographic operation on the data, and deletes the decrypted data encryption key(s). At operation 1124, the D-CaaS microservice application 18 returns the processed data to the custodian application 1130.

Policy-Based Access Control

In the example discussed above, the D-CaaS microservice application 18 may implement a policy-based access control model to restrict access to the re-encrypted data encryption key(s) that it protects. Policies will identify authorized clients or applications, such as the custodian applications 824, 924, 1024, and 1130, by unique attributes such as Distinguished Names (DN), and associate those attributes with selected actions the authorized clients or applications can perform using the data encryption key(s) and/or on selected resources. In an embodiment, one or more policies may be defined on the data encryption key(s) itself.

In some embodiments, as an alternative to transmitting the encrypted data encryption key(s) to the custodian applications, the centralized KMS (such as the centralized KMSs 822, 922, 1022, and 1132) may retain the data encryption key(s) rather than letting custodian applications manage their keys in an encrypted form. In such embodiments, when the D-CaaS microservice application 18 communicates with the centralized KMS to load a key, the D-CaaS microservice application 18 may not be provided with any grant or other authorization credential. The policies may limit which instance of the D-CaaS microservice application 18 may load the data encryption key(s) and what operations may be performed with the data encryption key(s).

Deployment of the D-CaaS Microservice Application

As discussed herein, the D-CaaS microservice application(s) may be "owned" or bound to an application (i.e., a custodian application). That is, a respective D-CaaS microservice application may be bound to only a single application on start-up and may be inaccessible to any other application. The D-CaaS microservice application runs in a secure enclave and securely loads one or more data encryption key(s) that may be needed by the owning application. After loading the data encryption key(s), the D-CaaS microservice application runs independently of any centralized Cryptography as a Service (CaaS) system. The D-CaaS microservice application may be implemented or consumed by a custodian application as an independent service or as a dependency built directly into the custodian application.

Figure 12:
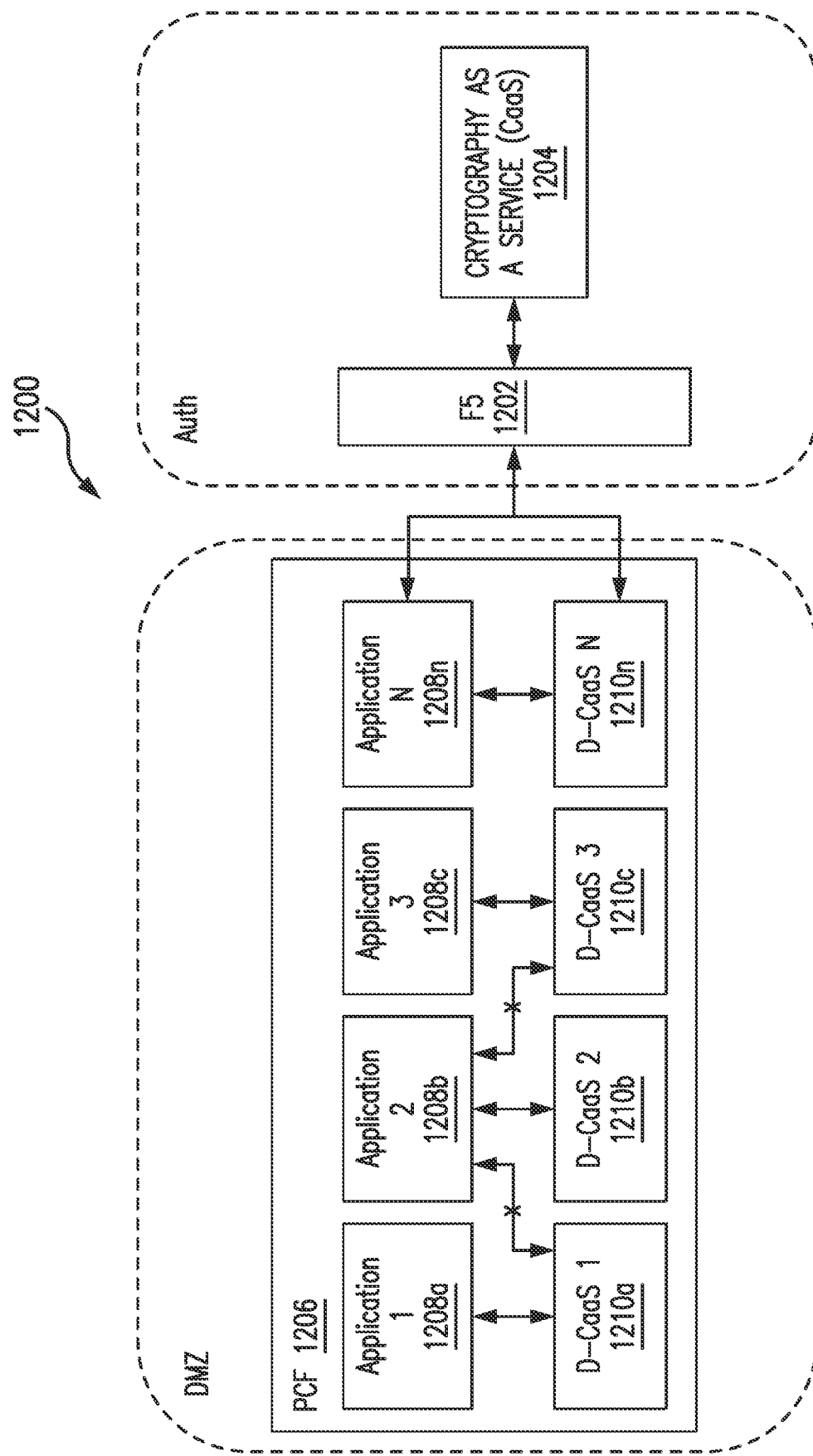
FIG. 12 is a block diagram of an on-premises deployment architecture of a D-CaaS microservice system, in accordance with one aspect of the present invention.

FIG. 12 is a block diagram of an on-premises deployment architecture of a D-CaaS microservice system 1200, in accordance with one aspect of the present invention. In the example embodiment, the D-CaaS microservice system 1200 may include an F5 computing device 1202 coupled in communication with a cryptography as a service (CaaS) system 1204. The F5 computing device 1202 may include, for example, internal load balancing computers that employ different routing algorithms and policies to address Internet protocol based requests (e.g., TCP, HTTP, etc.). The D-CaaS microservice system 1200 also may include a cloud-native application platform (PCF) 1206. A plurality of stand-alone applications 1208a-1208n may be running (or be executable) on the PCF 1206. As discussed herein, each application 1208a-1208n has a respective D-CaaS microservice application 1210a-1210n associated therewith, wherein the D-CaaS microservice application may be consumed as a service. For example, the calling application 1208a-1208n may consume the D-CaaS services through an exposed interface. The exposed interface may include, for example, an HTTP interface, Unix sockets, etc. In an embodiment, the D-CaaS microservice application may be exposed as a RESTful service.

In this embodiment, the applications 1208a-1208n needing a D-CaaS microservice application 1210a-1210n would not share its D-CaaS microservice application instance with any other application. An advantage of the D-CaaS microservice system 1200 is that such an architectural arrangement may limit the "blast-radius" from an availability or confidentiality exploit. That is, if an application or an instance of a D-CaaS microservice application is compromised, only that application and/or D-CaaS microservice application may be affected. The remaining applications and D-CaaS microservice applications may persist unaffected.

In example embodiments, certificate-based authentication or a Synapse/ISTIO pattern may be used to authenticate the applications 1208a-1208n and respective D-CaaS microservice applications 2110a-1210n associated therewith. In either embodiment, an instance or set of instances dedicated to a particular application may restrict access to only that application via policy enforcement or Distinguished Name (DN) validation.

In a certificate-based authentication system, the identity of the application 1208a-1208n or the D-CaaS microservice application 1210a-1210n may be verified using digital certificates. In such an authentication scheme, each entity, such as the application or the D-CaaS microservice, possesses a unique digital certificate that serves as a form of identification. Typically, a certificate authority (CA) generates a digital certificate for both the application and the D-CaaS microservice. The CA is a trusted entity responsible for verifying and issuing certificates, such as the CaaS service 1204. Each application and D-CaaS microservice application have their own certificate, which consists of a public key and identifying information such as an application identifier and digital signature. In some embodiments, mutual authentication may be implemented, where both the application and the D-CaaS microservice application verify each other's certificates. Such mutual authentication adds an extra layer of security by ensuring that both the application and the D-CaaS microservice application can authenticate each other.

In a Synapse/ISTIO pattern authentication system, mutual TLS (mTLS), which enables secure communication between services using certificates, may be used. With mTLS, the Synapse/ISTIO pattern can verify the identity of both the application and the D-CaaS microservice application. This ensures that only authenticated and authorized applications and services can communicate with each other. Furthermore, such an authentication system facilitates the use of access control policies using a policy framework. Access control rules based on attributes like request headers, request paths, and/or application identities may be defined. Policy enforcement ensures that only authorized requests are allowed to reach the destination applications and/or D-CaaS microservice applications.

Figure 13:
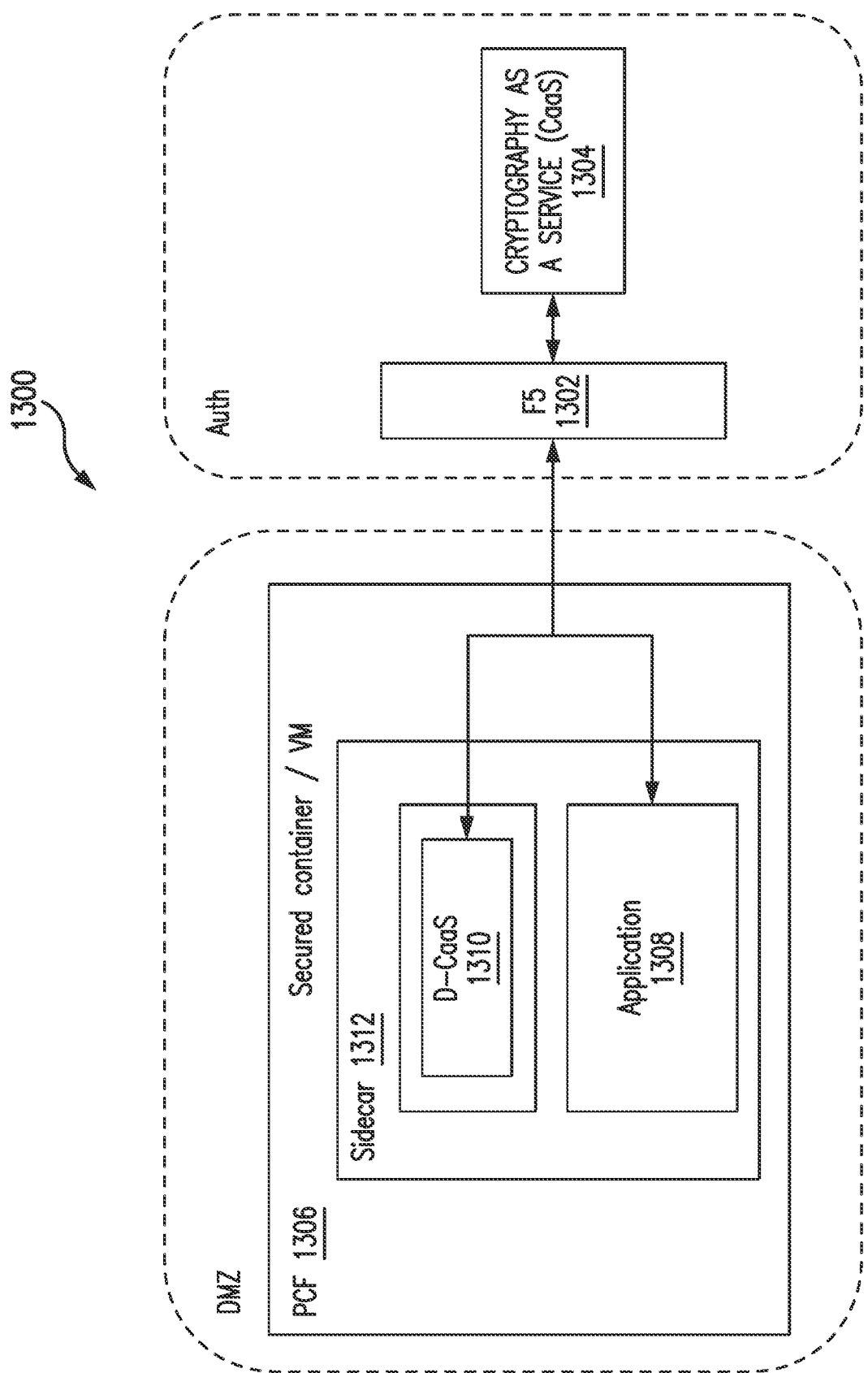
FIG. 13 is a block diagram of an on-premises deployment sidecar architecture of a D-CaaS microservice system, in accordance with one aspect of the present invention.

FIG. 13 is a block diagram of an on-premises deployment sidecar architecture of a D-CaaS microservice system 1300, in accordance with one aspect of the present invention. In the example embodiment, the D-CaaS microservice system 1300 may include an F5 computing device 1302 coupled in communication with a cryptography as a service (CaaS) system 1304. The F5 computing device 1302 may include, for example, internal load balancing computers that employ different routing algorithms and policies to address Internet protocol based requests (e.g., TCP, HTTP, etc.). The D-CaaS microservice system 1300 also may include a cloud-native application platform (PCF) 1306. A stand-alone application 1308 may be running (or be executable) on the PCF 1306. The application 1308 may be implemented via a secured container and/or on a virtual machine (VM). A D-CaaS microservice application 2110 may be connected to the application 1308 using a sidecar 1312.

The sidecar 1312 and D-CaaS microservice application 1210 may be implemented via the secured container/VM. The application 1308 may also be contained within the secured container/VM. In some embodiments, the D-CaaS microservice application 1310 may be implemented as a dependency. In an embodiment, the sidecar 1312 may provide a mechanism for managing secure access to the secured container/VM, such as the secure enclave 310 (shown in FIG. 3), associated with the D-CaaS microservice application 1310. The sidecar 1312 may provide a trusted execution environment for supporting security functions such as cryptographic key generation, storage and usage, and other features, as described herein.

It is noted that in both deployment architectures (i.e., systems 1200 and 1300), access control to the data encryption key(s) and their operations may be defined by policy-based access control, as described on the POLICY-BASED ACCESS CONTROL section above.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. An application server having a custodian application running thereon, the application server comprising:
    one or more processors; and
    a memory, the memory storing computer-executable instructions that when executed by the one or more processors, cause the one or more processors to:
        instantiate, by the custodian application, a cryptographic microservice application on the application server;
        build, by the cryptographic microservice application, a white-box cryptographic enclave in the memory of the application server;
        transmit, by the custodian application, a request message to an authentication computing system, the request message including a request for an authorization grant;
        in response to the request message, receive, by the custodian application, the authorization grant from the authentication computing system;
        transmit, by the custodian application, the authorization grant to the cryptographic microservice application;
        transmit, by the cryptographic microservice application, the authorization grant to the authentication computing system;
        receive, by the cryptographic microservice application, a digitally signed certificate from the authentication computing system;
        receive, by the cryptographic microservice application from the custodian application, a data encryption key encrypted with a master tenant key associated with the custodian application;
        transmit, by the cryptographic microservice application, a request to the authentication computing system, the request including the digitally signed certificate, the data encryption key, and a request to decrypt the data encryption key; and
        based on validation of the digitally signed certificate, receive, by the cryptographic microservice application, the decrypted data encryption key from the authentication computing system.

2. The application server in accordance with claim 1, the computer-executable instructions causing the one or more processors to generate, by the cryptographic microservice application, a public/private key pair inside the white-box cryptographic enclave.

3. The application server in accordance with claim 2, the computer-executable instructions causing the one or more processors to:
    generate, by the cryptographic microservice application, a certificate signing request; and
    sign, by the cryptographic microservice application, the certificate signing request with a private key of the public/private key pair.

4. The application server in accordance with claim 3, wherein transmitting the authorization grant to the authentication computing system comprises transmitting the authorization grant and the certificate signing request to the authentication computing system.

5. The application server in accordance with claim 3,
    wherein the public/private key pair comprises a private key and a corresponding public key,
    wherein the private key is securely stored within the white-box cryptographic enclave,
    wherein the public key is shared with the authentication computing system.

6. The application server in accordance with claim 5,
    wherein the cryptographic microservice application having a unique identifier,
    wherein the digitally signed certificate operates to bind the private key of the cryptographic microservice application to the unique identifier of the cryptographic microservice application.

7. The application server in accordance with claim 1,
    the computer-executable instructions causing the one or more processors to negotiate, by the cryptographic microservice application, a secure communication channel between the cryptographic microservice application and the authentication computing system,
    wherein receiving the decrypted data encryption key from the authentication computing system comprises receiving the decrypted data encryption key over the secure communication channel.

8. A method performed by an application server, the application server having a memory and a custodian application running thereon, the method comprising:
    instantiating, by the custodian application, a cryptographic microservice application on the application server;
    building, by the cryptographic microservice application, a white-box cryptographic enclave in the memory of the application server;
    transmitting, by the custodian application, a request message to an authentication computing system, the request message including a request for an authorization grant;
    in response to the request message, receiving, by the custodian application, the authorization grant from the authentication computing system;
    transmitting, by the custodian application, the authorization grant to the cryptographic microservice application;
    transmitting, by the cryptographic microservice application, the authorization grant to the authentication computing system;
    receiving, by the cryptographic microservice application, a digitally signed certificate from the authentication computing system;
    receiving, by the cryptographic microservice application from the custodian application, a data encryption key encrypted with a master tenant key associated with the custodian application;

transmitting, by the cryptographic microservice application, a request to the authentication computing system, the request including the digitally signed certificate, the data encryption key, and a request to decrypt the data encryption key; and based on validation of the digitally signed certificate, receiving, by the cryptographic microservice application, the decrypted data encryption key from the authentication computing system.

9. The method in accordance with claim 8, further comprising generating, by the cryptographic microservice application, a public/private key pair inside the white-box cryptographic enclave.

10. The method in accordance with claim 9, further comprising:
generating, by the cryptographic microservice application, a certificate signing request; and
signing, by the cryptographic microservice application, the certificate signing request with a private key of the public/private key pair.

11. The method in accordance with claim 10, wherein transmitting the authorization grant to the authentication computing system comprises transmitting the authorization grant and the certificate signing request to the authentication computing system.

12. The method in accordance with claim 10,
wherein the public/private key pair comprises a private key and a corresponding public key,
wherein the private key is securely stored within the white-box cryptographic enclave,
wherein the public key is shared with the authentication computing system.

13. The method in accordance with claim 12,
wherein the cryptographic microservice application having a unique identifier,
wherein the digitally signed certificate operates to bind the private key of the cryptographic microservice application to the unique identifier of the cryptographic microservice application.

14. The method in accordance with claim 8, further comprising negotiating, by the cryptographic microservice application, a secure communication channel between the cryptographic microservice application and the authentication computing system,
wherein receiving the decrypted data encryption key from the authentication computing system comprises receiving the decrypted data encryption key over the secure communication channel.

15. A non-transitory computer-readable storage medium having computer-executable instructions stored thereon, the computer-executable instructions, when executed by one or more processors, causing the one or more processors to:
instantiate a cryptographic microservice application;
build, by the cryptographic microservice application, a white-box cryptographic enclave in a memory of an application server;
transmit a request message to an authentication computing system, the request message including a request for an authorization grant;
in response to the request message, receive the authorization grant from the authentication computing system;

transmit the authorization grant to the cryptographic microservice application;
transmit, by the cryptographic microservice application, the authorization grant to the authentication computing system;
receive, by the cryptographic microservice application, a digitally signed certificate from the authentication computing system;
transmit, to the cryptographic microservice application, a data encryption key encrypted with a master tenant key associated with a custodian application;
transmit, by the cryptographic microservice application, a request to the authentication computing system, the request including the digitally signed certificate, the data encryption key, and a request to decrypt the data encryption key; and
based on validation of the digitally signed certificate, receive, by the cryptographic microservice application, the decrypted data encryption key from the authentication computing system.

16. The non-transitory computer-readable storage medium in accordance with claim 15,
the computer-executable instructions causing the one or more processors to generate, by the cryptographic microservice application, a public/private key pair inside the white-box cryptographic enclave.

17. The non-transitory computer-readable storage medium in accordance with claim 16,
the computer-executable instructions causing the one or more processors to:
generate, by the cryptographic microservice application, a certificate signing request; and
sign, by the cryptographic microservice application, the certificate signing request with a private key of the public/private key pair.

18. The non-transitory computer-readable storage medium in accordance with claim 17, wherein transmitting the authorization grant to the authentication computing system comprises transmitting the authorization grant and the certificate signing request to the authentication computing system.

19. The non-transitory computer-readable storage medium in accordance with claim 17,
wherein the public/private key pair comprises a private key and a corresponding public key,
wherein the private key is securely stored within the white-box cryptographic enclave,
wherein the public key is shared with the authentication computing system.

20. The non-transitory computer-readable storage medium in accordance with claim 15,
the computer-executable instructions causing the one or more processors to negotiate, by the cryptographic microservice application, a secure communication channel between the cryptographic microservice application and the authentication computing system,
wherein receiving the decrypted data encryption key from the authentication computing system comprises receiving the decrypted data encryption key over the secure communication channel.

* * * * *